US010742874B2

(12) United States Patent
Horita

(10) Patent No.: US 10,742,874 B2
(45) Date of Patent: Aug. 11, 2020

(54) IMAGING PLAN GENERATION DEVICE, IMAGING PLAN GENERATION METHOD, AND PROGRAM

(71) Applicant: FUJIFILM Corporation, Tokyo (JP)

(72) Inventor: Shuhei Horita, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/366,970

(22) Filed: Mar. 27, 2019

(65) Prior Publication Data

US 2019/0222751 A1 Jul. 18, 2019

Related U.S. Application Data

(63) Continuation of application No. PCT/JP2017/036477, filed on Oct. 6, 2017.

(30) Foreign Application Priority Data

Oct. 14, 2016 (JP) .............................. 2016-202589
Sep. 8, 2017 (JP) .............................. 2017-173282

(51) Int. Cl.
*H04N 5/232* (2006.01)
*H04N 7/18* (2006.01)
(Continued)

(52) U.S. Cl.
CPC ............ *H04N 5/23222* (2013.01); *B25J 5/00* (2013.01); *B25J 13/00* (2013.01); *B25J 13/08* (2013.01);
(Continued)

(58) Field of Classification Search
CPC ........... H04N 5/23222; H04N 5/23299; H04N 7/185; H04N 13/239; H04N 2013/0081;
(Continued)

(56) References Cited

U.S. PATENT DOCUMENTS

2012/0120246 A1* 5/2012 Uchima ................. E01D 22/00
348/164
2017/0010615 A1* 1/2017 Tanaka ................. G05D 1/0094
(Continued)

FOREIGN PATENT DOCUMENTS

JP 2003-266345 A 9/2003
JP 2005-339408 A 12/2005
(Continued)

OTHER PUBLICATIONS

International Search Report issued in PCT/JP2017/036477; dated Jan. 9, 2018.
(Continued)

*Primary Examiner* — Tung T Vo
(74) *Attorney, Agent, or Firm* — Studebaker & Brackett PC

(57) ABSTRACT

Disclosed are an imaging plan generation device, an imaging plan generation method, and a program that generate an imaging plan for efficiently imaging captured images for use in inspection of a bridge without omission. An imaging plan generation device (400) includes a space information acquisition unit (401) that acquires space information of a panel, a first decision unit (403) that decides a plurality of deck slab imaging positions and postures of a camera based on the space information of the panel, a second decision unit (405) that decides, based on the space information of the panel, a plurality of steel member imaging positions and postures of the camera in imaging a plurality of joint portions of steel members with the camera, and an imaging plan generation unit (407) that generates an imaging plan of a camera-equipped mobile robot based on the plurality of deck slab imaging positions and postures decided by the first decision unit and the plurality of steel member imaging positions and postures decided by the second decision unit.

17 Claims, 22 Drawing Sheets

(51) Int. Cl.
*H04N 13/239* (2018.01)
*G06T 7/73* (2017.01)
*G05D 1/00* (2006.01)
*B25J 19/02* (2006.01)
*B25J 13/08* (2006.01)
*G06T 7/593* (2017.01)
*B25J 5/00* (2006.01)
*B25J 13/00* (2006.01)
*E01D 19/10* (2006.01)

(52) U.S. Cl.
CPC .......... *B25J 19/023* (2013.01); *E01D 19/106* (2013.01); *G05D 1/0094* (2013.01); *G06T 7/593* (2017.01); *G06T 7/73* (2017.01); *H04N 5/23299* (2018.08); *H04N 7/185* (2013.01); *H04N 13/239* (2018.05); *B25J 5/007* (2013.01); *G06T 2207/10012* (2013.01); *G06T 2207/30244* (2013.01)

(58) Field of Classification Search
CPC ... H04N 7/183; B25J 5/00; B25J 13/00; B25J 19/023; B25J 13/08; B25J 5/007; B25J 5/02; E01D 19/106; G06T 7/73; G06T 7/593; G06T 2207/30244; G06T 2207/10012; G05D 1/0094

USPC .......................................................... 348/47
See application file for complete search history.

(56) References Cited

U.S. PATENT DOCUMENTS

| | | | |
|---|---|---|---|
| 2017/0016615 A1* | 1/2017 | Morandi | F23L 15/04 |
| 2017/0169582 A1* | 6/2017 | Tanaka | B64D 47/08 |
| 2017/0277187 A1* | 9/2017 | Refai | G06T 7/30 |
| 2017/0308088 A1* | 10/2017 | Sabe | G08G 5/045 |
| 2018/0180534 A1* | 6/2018 | Noda | G01N 21/8806 |
| 2019/0094149 A1* | 3/2019 | Troy | G01M 5/0008 |

FOREIGN PATENT DOCUMENTS

| | | |
|---|---|---|
| JP | 2006-031144 A | 2/2006 |
| JP | 2011-192270 A | 9/2011 |
| JP | 2016-079614 A | 5/2016 |
| JP | 2016-079615 A | 5/2016 |
| JP | 2016-151129 A | 8/2016 |

OTHER PUBLICATIONS

International Preliminary Report on Patentability and Written Opinion issued in PCT/JP2017/036477; dated Apr. 16, 2019.

* cited by examiner

FIG. 7
(A)
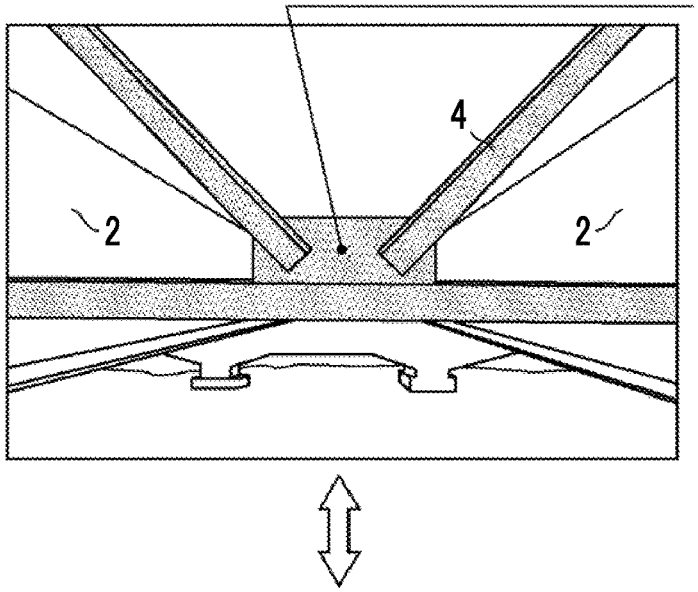
(B)
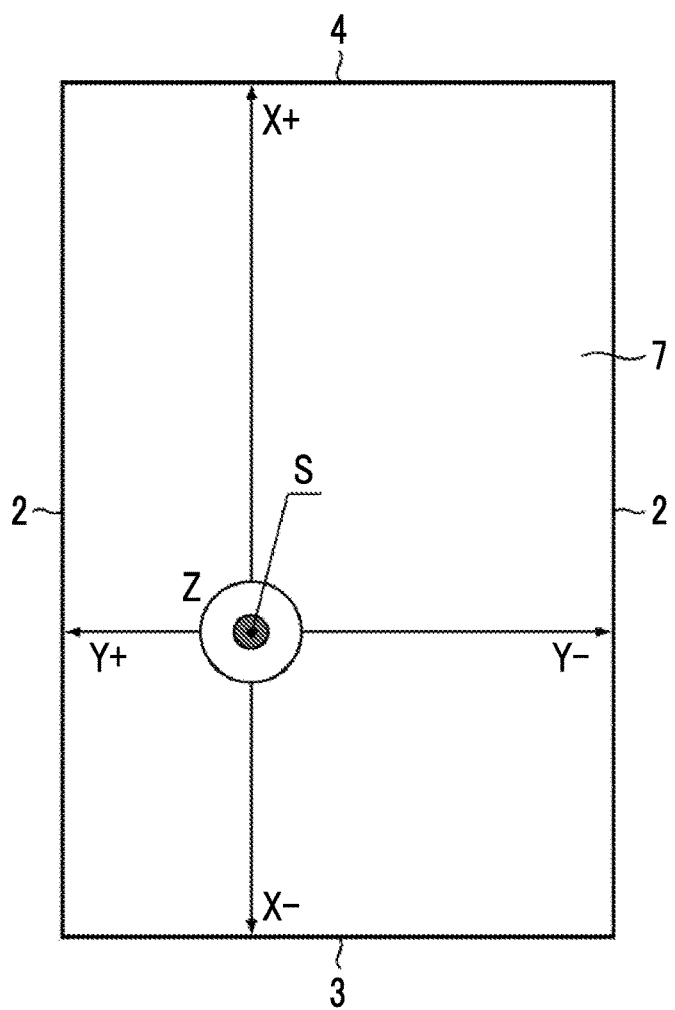

FIG. 11
(A)
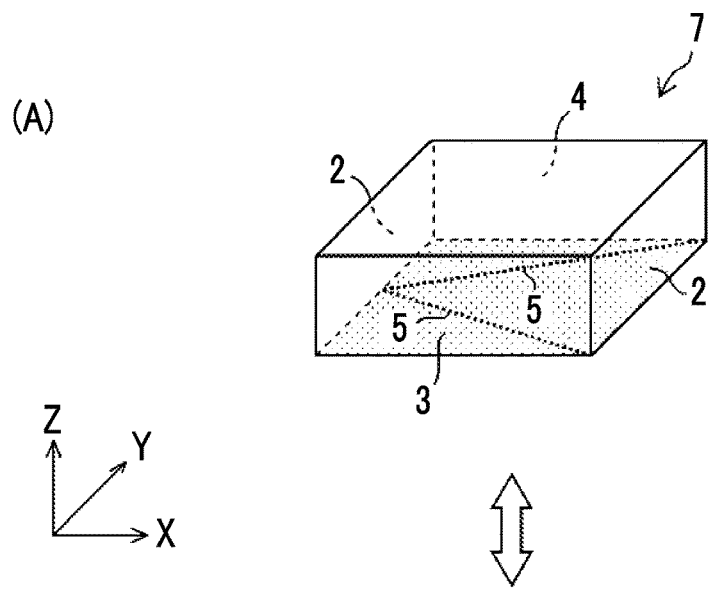
(B)
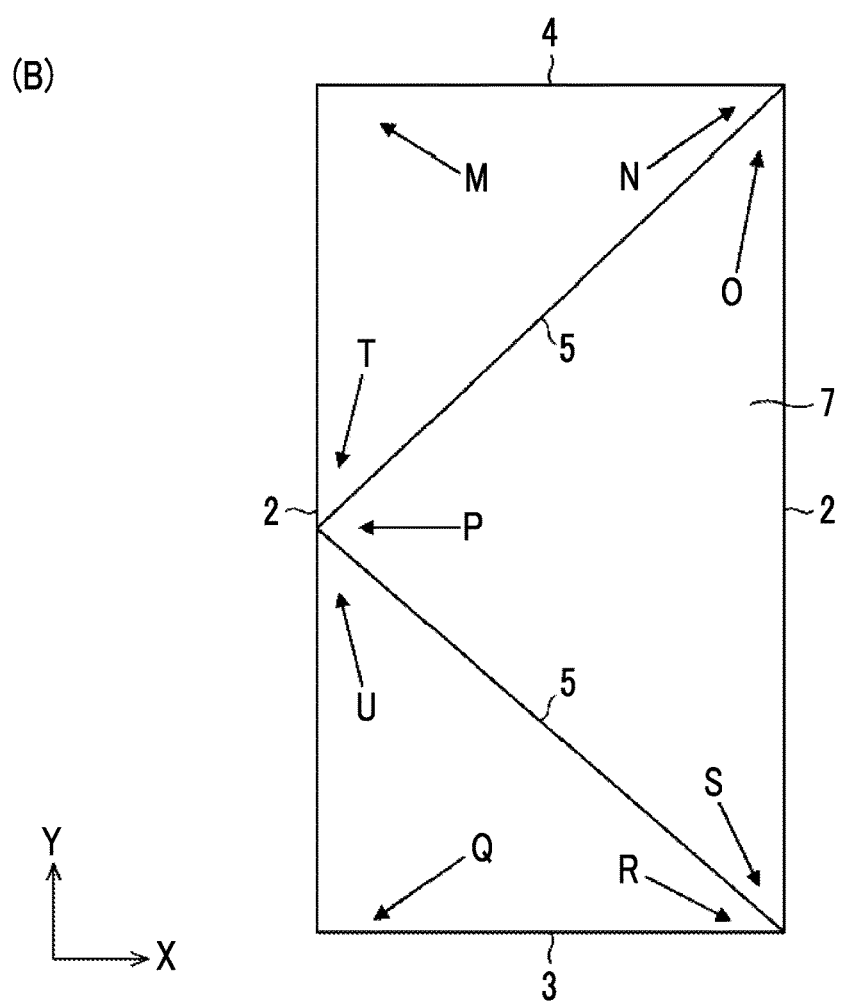

FIG. 12
(A)
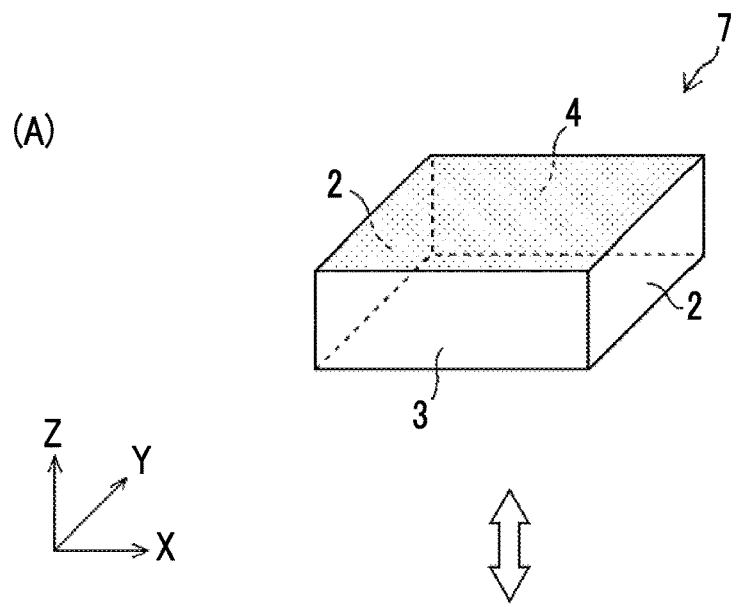
(B)
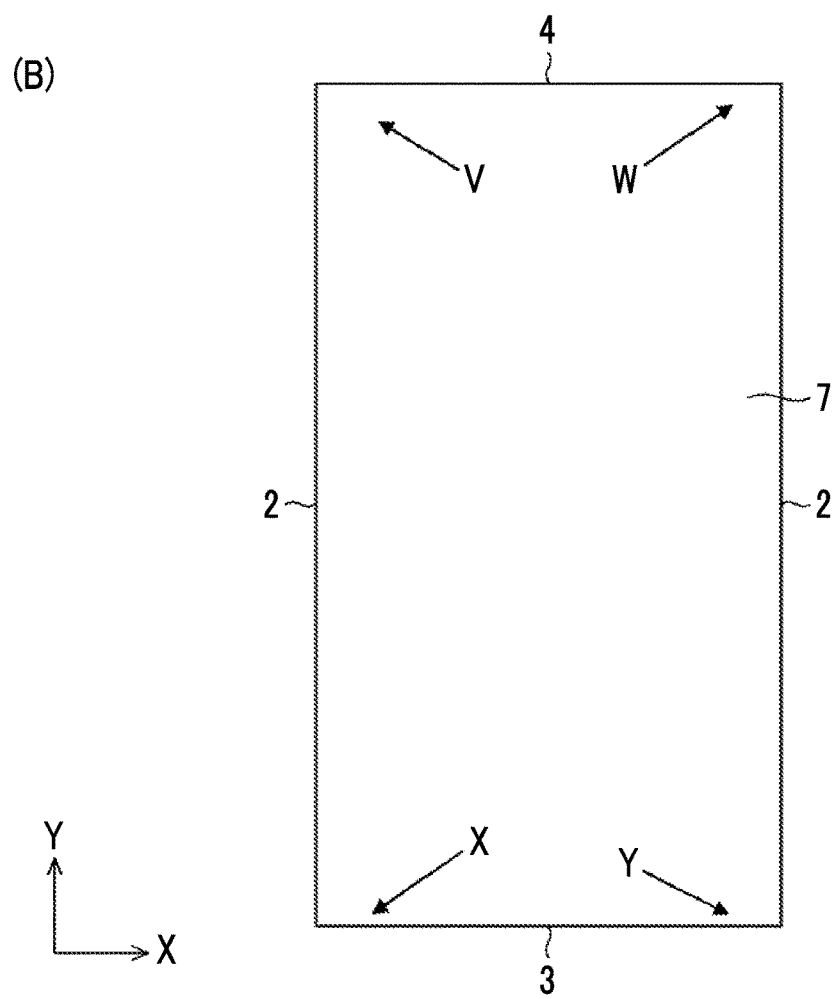

IMAGING PLAN GENERATION DEVICE, IMAGING PLAN GENERATION METHOD, AND PROGRAM

CROSS-REFERENCE TO RELATED APPLICATIONS

The present application is a Continuation of PCT International Application No. PCT/JP2017/036477 filed on Oct. 6, 2017 claiming priority under 35 U.S.C § 119(a) to Japanese Patent Application No. 2016-202589 filed on Oct. 14, 2016 and Japanese Patent Application No. 2017-173282 filed on Sep. 8, 2017. Each of the above applications is hereby expressly incorporated by reference, in their entirety, into the present application.

BACKGROUND OF THE INVENTION

1. Field of the Invention

The present invention relates to an imaging plan generation device, an imaging plan generation method, and a program, and in particular, to an imaging plan generation device, an imaging plan generation method, and a program that generate an imaging plan of a camera-equipped mobile robot.

2. Description of the Related Art

In the related art, a technique that images a structure, such as a bridge, with a robot device (camera-equipped mobile robot) with a camera and performs inspection of the structure using the captured image has been suggested.

For example, JP2016-079615A discloses a camera-equipped movable robot that, in a case where a lower surface of a deck slab of a bridge or a steel plate girder is inspected, is attached to the lower surface of the bridge by a suspended carriage and rails.

In the related art, a technique relating to generation of a movement plan of a mobile robot has been suggested.

For example, JP2003-266345A discloses a technique relating to generation of a moving route plan in a case where a robot device is moved to a destination. In the technique described in JP2003-266345A, the robot device is made to observe an unobserved region on the moving route under a given condition, thereby updating an obstacle map for use in generating a moving route plan to generate the moving route plan.

SUMMARY OF THE INVENTION

In general, in a case where a bridge is inspected, inspection is performed on a deck slab and steel members, such as a main girder, constituting the bridge. Then, a camera-equipped mobile robot that performs the inspection of the bridge should acquire captured images for inspection on the deck slab and the steel members constituting the bridge without omission. Since the camera-equipped mobile robot that performs the inspection of the bridge needs to acquire many captured images, the camera-equipped mobile robot needs to efficiently acquire the captured images for the inspection of the deck slab and the steel members.

However, in JP2016-079615A and JP2003-266345A described above, there is no description of an imaging plan relating to the acquisition of the captured images for the inspection of the bridge. That is, in JP2016-079615A and JP2003-266345A described above, there is no description of the imaging plan of the captured images for the inspection of the deck slab and the steel members of the bridge.

The invention has been accomplished in consideration of such a situation, and an object of the invention is to provide an imaging plan generation device, an imaging plan generation method, and a program that generate an imaging plan for efficiently imaging captured images for use in inspection of a bridge without omission.

In order to achieve the above-described object, an aspect of the invention provides an imaging plan generation device that generates an imaging plan of a camera-equipped mobile robot moving a camera within a three-dimensional space and changing a posture of the camera in imaging a deck slab and steel members including a main girder and a cross beam or a cross frame of a bridge as an inspection target. The imaging plan generation device comprises a space information acquisition unit that acquires space information of one panel divided by two facing main girders and two facing cross beams or cross frames, a first decision unit that decides, based on the space information of the panel, a plurality of deck slab imaging positions and postures of the camera in dividing the entire deck slab corresponding to the one panel into a plurality of pieces and imaging the plurality of pieces with the camera, a second decision unit that decides, based on the space information of the panel, a plurality of steel member imaging positions and postures of the camera in imaging at least a plurality of joint portions of the steel members among the steel members corresponding to the one panel with the camera, and an imaging plan generation unit that generates the imaging plan of the camera-equipped mobile robot based on the plurality of deck slab imaging positions and postures decided by the first decision unit and the plurality of steel member imaging positions and postures decided by the second decision unit.

According to the aspect, the plurality of deck slab imaging positions and postures of the camera in dividing the entire deck slab corresponding to the one panel into a plurality of pieces and imaging the plurality of pieces with the camera are decided by the first decision unit based on the space information of the panel. According to the aspect, the plurality of steel member imaging positions and postures of the camera in imaging at least the plurality of joint portions of the steel members among the steel members corresponding to the one panel with the camera are decided by the second decision unit based on the space information of the panel. Then, according to the aspect, since the imaging plan is generated based on the imaging positions and postures decided by the first decision unit and the second decision unit, it is possible to generate an imaging plan capable of efficiently imaging captured images of the deck slab and the steel members constituting the bridge without omission.

Preferably, the space information acquisition unit acquires the space information based on CAD drawing data of the bridge.

According to the aspect, since the space information acquisition unit acquires the space information based on the CAD drawing data of the bridge, the space information acquisition unit can acquire accurate space information.

Preferably, the space information acquisition unit acquires a first distance to the two facing main girders, a second distance to the two facing cross beams or cross frames, and a third distance to the deck slab based on a robot initial position within the three-dimensional space measured by a distance measurement unit, and acquires the space information based on the acquired first distance, second distance, and third distance.

According to the aspect, the first distance to the two facing main girders, the second distance to the two facing cross beams or cross frames, and the third distance to the deck slab based on the robot initial position within the three-dimensional space are measured by the distance measurement unit. Then, according to the aspect, the space information acquisition unit acquires the space information based on the first distance, the second distance, and the third distance acquired by the distance measurement unit. With this, in the aspect, even in a case where the CAD drawing data of the bridge is absent, since the space information is acquired based on distance information measured by the distance measurement unit, it is possible to generate an imaging plan.

Preferably, the imaging plan generation device further comprises a member information acquisition unit that acquires member information as information relating to a member of the panel, the first decision unit decides the deck slab imaging positions and postures based on the space information of the panel and the member information, and the second decision unit decides the steel member imaging positions and postures based on the space information of the panel and the member information.

According to the aspect, the member information as information relating to the member of the panel is acquired by the member information acquisition unit, and the first decision unit and the second decision unit decide the imaging positions and postures using the acquired member information and the space information. With this, in the aspect, even in a case where the members are provided in the bridge, it is possible to generate an imaging plan capable of efficiently imaging captured images for inspection without omission.

Preferably, the imaging plan generation device further comprises a member information acquisition unit that acquires member information as information relating to a member of the panel, the member information being information relating to a fourth distance to a lateral frame based on the robot initial position, a width of the lateral frame, and a shape of the lateral frame, the first decision unit decides the deck slab imaging positions and postures based on the space information of the panel and the member information, and the second decision unit decides the steel member imaging positions and postures based on the space information of the panel and the member information.

According to the aspect, information relating to the fourth distance to the lateral frame based on the robot initial position, the width of the lateral frame, and the shape of the lateral frame is acquired by the member information acquisition unit. With this, in the aspect, even in a case where the members are provided in the bridge, it is possible to efficiently image captured images for inspection without omission.

Preferably, the first decision unit calculates a horizontal plane imaging range as an imaging range in a horizontal plane of the lateral frame using the fourth distance, a focal length of the camera, and a size of an imaging element of the camera, and decides the deck slab imaging positions and postures based on the space information of the panel, the member information, and the horizontal plane imaging range.

According to the aspect, the horizontal plane imaging range as the imaging range in the horizontal plane of the lateral frame is calculated by the first decision unit, and the deck slab imaging positions and postures are decided based on the horizontal plane imaging range, the space information of the panel, and the member information. With this, in the aspect, since an imaging plan taking into consideration the imaging range in the horizontal plane of the lateral frame is generated, it is possible to generate an imaging plan capable of efficiently imaging the deck slab without omission.

Preferably, the first decision unit calculates a deck slab imaging range using the third distance, a focal length of the camera, and a size of an imaging element of the camera, and decides the deck slab imaging positions based on the deck slab imaging range and the space information of the panel.

According to the aspect, since the deck slab imaging range is calculated by the first decision unit, and the deck slab imaging positions are decided based on the calculated imaging range, it is possible to generate an imaging plan capable of efficiently imaging the captured images of the deck slab without omission.

Preferably, the imaging plan generation device further comprises an imaging plan database in which a plurality of existing imaging plans are stored, the first decision unit selects the existing imaging plan from the imaging plan database based on the space information of the panel and decides the deck slab imaging positions based on the selected existing imaging plan, and the second decision unit selects the existing imaging plan from the imaging plan database based on the space information of the panel and decides the steel member imaging positions and postures based on the selected existing imaging plan.

According to the aspect, the imaging plan database in which the plurality of existing imaging plans are stored is provided, and the first decision unit and the second decision unit select the existing imaging plan from the imaging plan database based on the space information and decide the imaging positions and postures based on the selected existing imaging plan. With this, in the aspect, it is possible to efficiently generate an imaging plan based on the existing imaging plan.

Preferably, the imaging plan generation device further comprises a member information acquisition unit that acquires member information as information relating to a member of the panel, and the imaging plan generation unit corrects the deck slab imaging positions and postures decided by the first decision unit and the steel member imaging positions and postures decided by the second decision unit based on the difference between the space information acquired by the space information acquisition unit and space information of the selected imaging plan or the difference between the member information acquired by the space information acquisition unit and member information of the selected imaging plan.

According to the aspect, the imaging positions and postures decided by the first decision unit or the second decision unit are corrected based on the difference between the space information acquired by the space information acquisition unit and the space information of the selected imaging plan or the difference between the member information acquired by the space information acquisition unit and the member information of the selected imaging plan. With this, in the aspect, since the existing imaging plan is corrected, it is possible to generate an efficient imaging plan without omission.

Preferably, the imaging plan generation device further comprises a storage control unit that makes the imaging plan database store the imaging plan generated by the imaging plan generation unit.

According to the aspect, since the generated imaging plan is stored in the imaging plan database by the storage control unit, it is possible to effectively use the generated imaging plan.

Preferably, the imaging plan generation device further comprises an imaging plan adjustment unit that adjusts the deck slab imaging positions and postures or the steel member imaging positions and postures in the imaging plan generated by the imaging plan generation unit based on an adjustment command of the deck slab imaging positions and postures or the steel member imaging positions and postures.

According to the aspect, the deck slab imaging positions and postures or the steel member imaging positions and postures in the imaging plan are adjusted by the imaging plan adjustment unit based on the adjustment command of the deck slab imaging positions and postures or the steel member imaging positions and postures.

Preferably, the imaging plan generation device further comprises an imaging plan addition unit that adds the deck slab imaging positions or the steel member imaging positions to the imaging plan generated by the imaging plan generation unit based on an addition command of the deck slab imaging positions or the steel member imaging positions.

According to the aspect, deck slab imaging positions or the steel member imaging positions are added to the imaging plan generated by the imaging plan generation unit by the imaging plan addition unit based on the addition command. With this, in the aspect, the deck slab imaging positions or the steel member imaging positions are added to the imaging plan based on the addition command.

Preferably, the first decision unit decides the deck slab imaging positions in a case where the camera is made to face the deck slab.

According to the aspect, since the deck slab imaging positions in a case where the camera is made to face the deck slab are decided by the first decision unit, captured images are efficiently acquired without omission.

Another aspect of the invention provides an imaging plan generation method that generates an imaging plan of a camera-equipped mobile robot moving a camera within a three-dimensional space and changing a posture of the camera in imaging a deck slab and steel members including a main girder and a cross beam or a cross frame of a bridge as an inspection target. The imaging plan generation method comprises a space information acquisition step of acquiring space information of one panel divided by two facing main girders and two facing cross beams or cross frames, a first decision step of deciding, based on the space information of the panel, a plurality of deck slab imaging positions and postures of the camera in dividing the entire deck slab corresponding to the one panel into a plurality of pieces and imaging the plurality of pieces with the camera, a second decision step of deciding, based on the space information of the panel, a plurality of steel member imaging positions and postures of the camera in imaging at least a plurality of joint portions of the steel members among the steel members corresponding to the one panel with the camera, and an imaging plan generation step of generating the imaging plan of the camera-equipped mobile robot based on the plurality of deck slab imaging positions and postures decided in the first decision step and the plurality of steel member imaging positions and postures decided in the second decision step.

A further aspect of the invention provides a program that causes a computer to execute an imaging plan generation method of generating an imaging plan of a camera-equipped mobile robot moving a camera within a three-dimensional space and changing a posture of the camera in imaging a deck slab and steel members including a main girder and a cross beam or a cross frame of a bridge as an inspection target. The program causes the computer to execute a space information acquisition step of acquiring space information of one panel divided by two facing main girders and two facing cross beams or cross frames, a first decision step of deciding, based on the space information of the panel, a plurality of deck slab imaging positions and postures of the camera in dividing the entire deck slab corresponding to the one panel into a plurality of pieces and imaging the plurality of pieces with the camera, a second decision step of deciding, based on the space information of the panel, a plurality of steel member imaging positions and postures of the camera in imaging at least a plurality of joint portions of the steel members among the steel members corresponding to the one panel with the camera, and an imaging plan generation step of generating the imaging plan of the camera-equipped mobile robot based on the plurality of deck slab imaging positions and postures decided in the first decision step and the plurality of steel member imaging positions and postures decided in the second decision step.

According to the invention, a plurality of deck slab imaging positions and postures of the camera in dividing the entire deck slab corresponding to one panel into a plurality of pieces and imaging a plurality of pieces with the camera are decided by the first decision unit based on the space information of the panel, a plurality of steel member imaging positions and postures of the camera in imaging at least a plurality of joint portions of the steel members among the steel members corresponding to one panel with the camera are decided by the second decision unit based on the space information of the panel, and the imaging plan is generated based on the imaging positions and postures decided by the first decision unit and the second decision unit. For this reason, it is possible to generate an imaging plan capable of efficiently acquiring the captured images of the deck slab and the steel members constituting the bridge without omission.

BRIEF DESCRIPTION OF THE DRAWINGS

FIG. 7 is a diagram illustrating distance measurement of a distance measurement unit.

FIG. 11 is a diagram illustrating a steel member imaging decision unit.

FIG. 12 is a diagram illustrating the steel member imaging decision unit.

DESCRIPTION OF THE PREFERRED EMBODIMENTS

Hereinafter, a preferred embodiment of an imaging plan generation device, an imaging plan generation method, and a program according to the invention will be described referring to the accompanying drawings.

Figure 1:
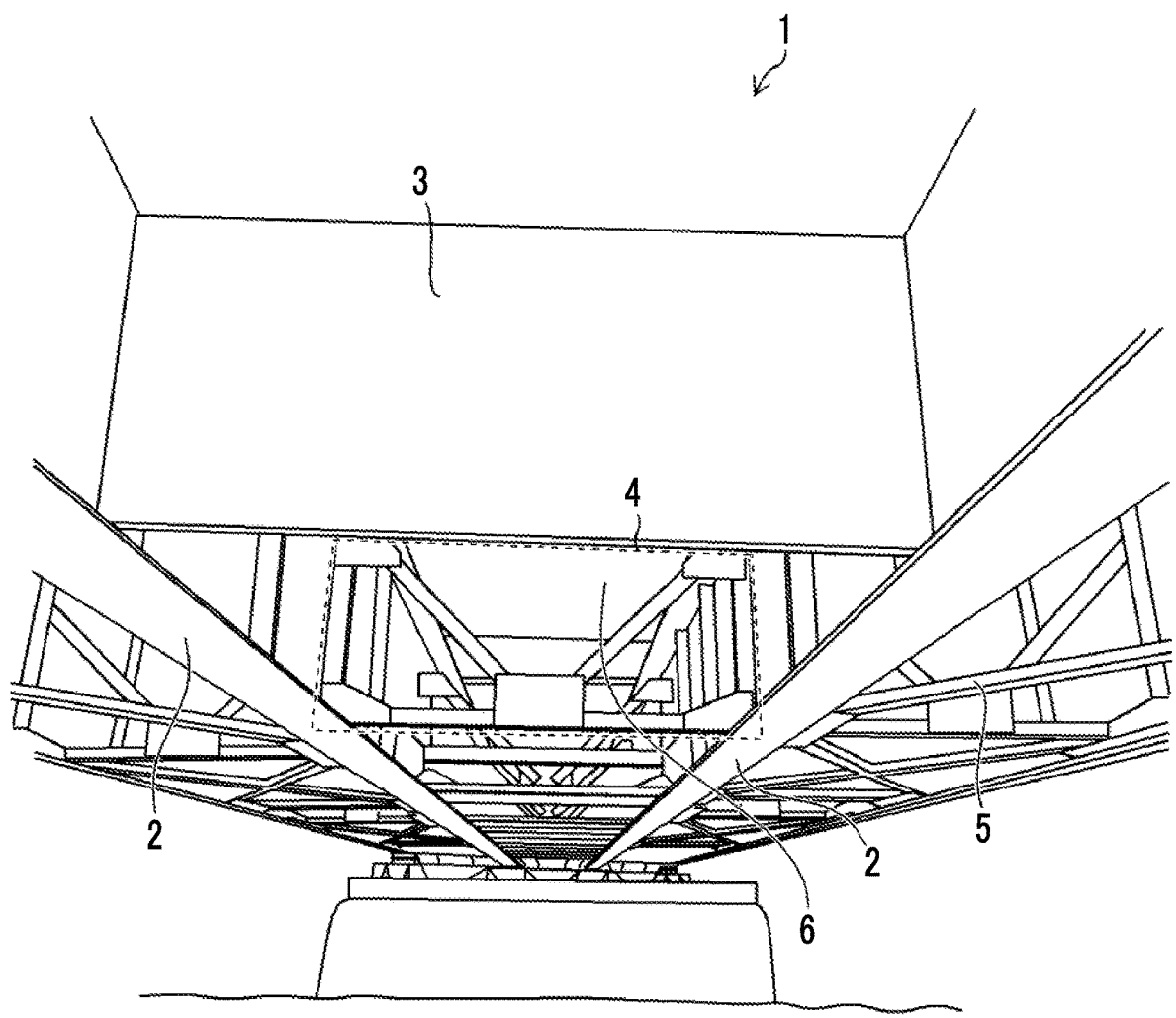
FIG. 1 is a perspective view showing a structure of a bridge.

FIG. 1 is a perspective view showing a structure of a bridge 1 that is one of structures as an inspection target, and is a perspective view of the bridge 1 when viewed from the below.

The bridge 1 shown in FIG. 1 has main girders 2, cross beams 3, cross frames 4, and lateral frames 5, and the main girders 2, the cross beams 3, the cross frames 4, and the lateral frames 5 are connected by bolts, rivets or welding. Deck slabs 6 on which vehicles and the like travel are placed on the main girders 2 and the like. The deck slabs 6 are generally made of reinforced concrete.

The main girder 2 is a member that is laid between the abutments or the bridge piers and supports the load of the vehicles and the like on the deck slab 6. The cross beam 3 is a member that connects the main girders 2 to support the load by a plurality of main girders 2. The cross frame 4 and the lateral frame 5 are members that connect the main girders 2 to resist a lateral load of wind and earthquake, respectively. A panel is a space that is formed by dividing the deck slab 6 by two facing main girders 2 and two facing cross beams 3 or cross frames 4, and in a case where inspection of the bridge 1 is performed, inspection may be performed in units of panels.

Figure 2:
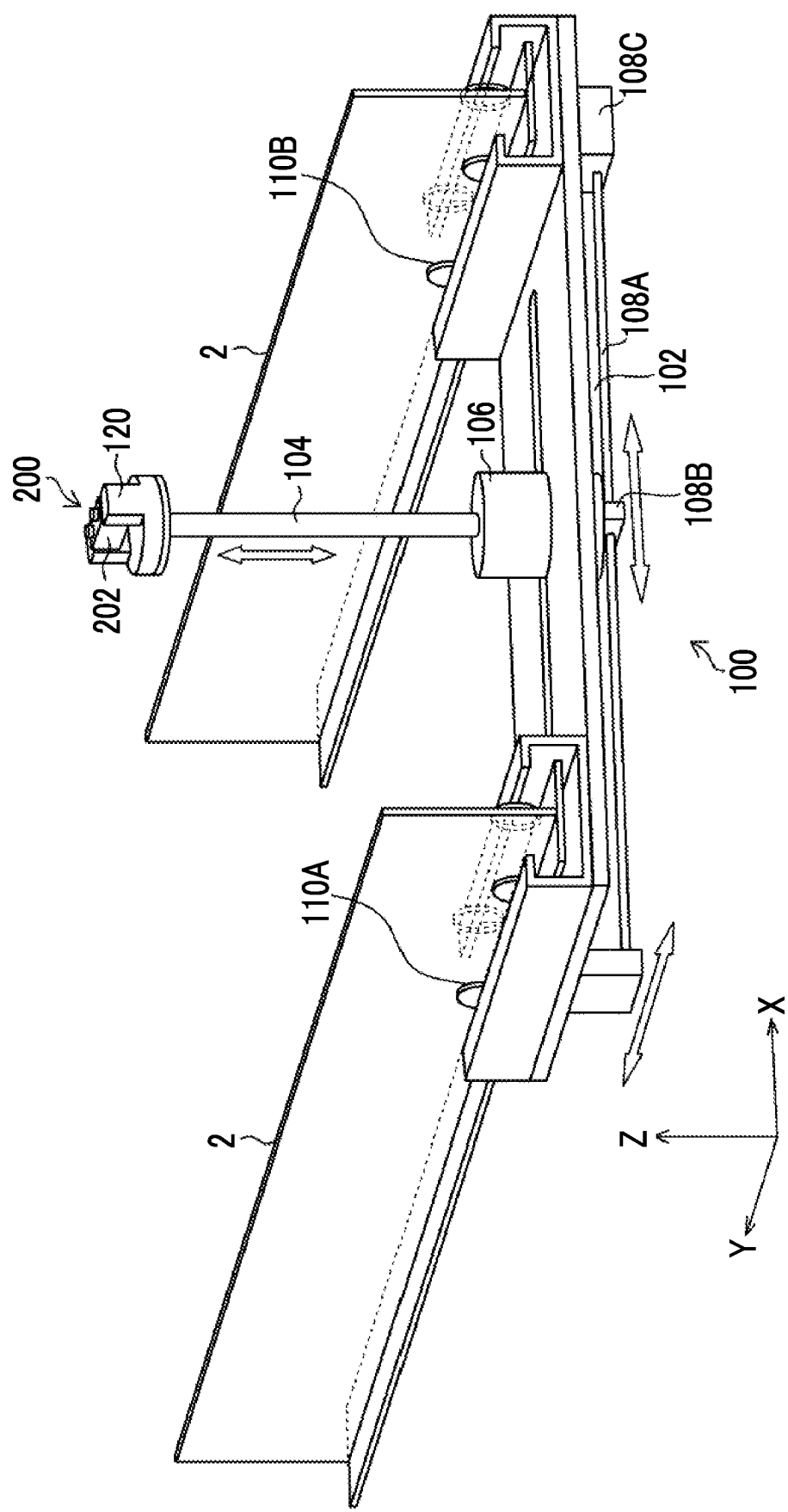
FIG. 2 is a perspective view showing an appearance of a robot device.
Figure 3:
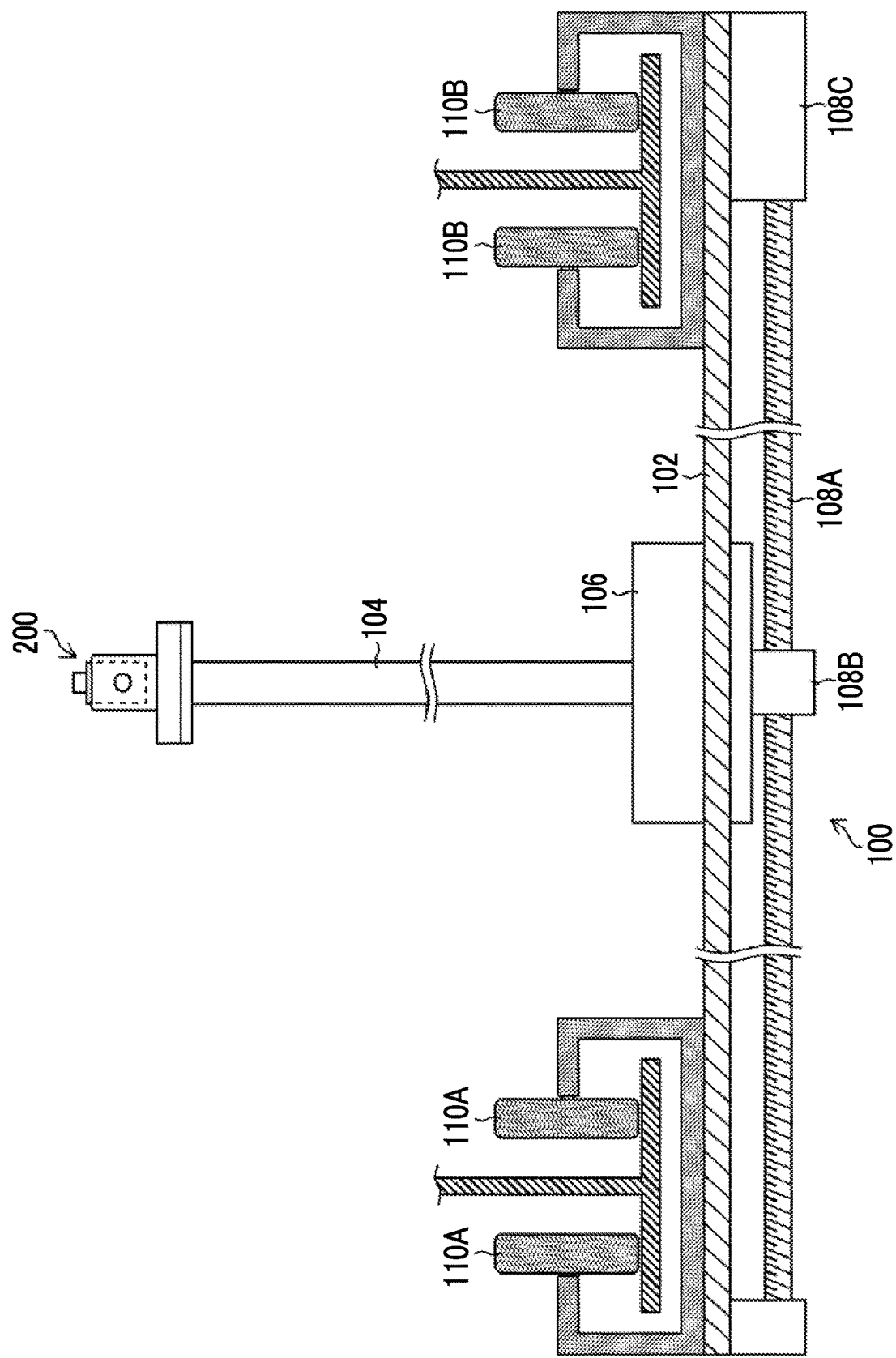
FIG. 3 is a cross-sectional view of a main part of the robot device.

FIG. 2 is a perspective view showing an appearance of a robot device 100 including a twin-lens camera 202 according to an embodiment of an imaging device 200, and shows a state in which the robot device 100 is provided between the main girders 2 of the bridge 1. FIG. 3 is a cross-sectional view showing a main part of the robot device 100 shown in FIG. 2. The robot device 100 is an example of a camera-equipped mobile robot, and a robot for an inspection work of the bridge 1.

As shown in FIGS. 2 and 3, the robot device 100 comprises the imaging device 200, and controls a position (imaging position) of the imaging device 200 within a three-dimensional space and controls an imaging direction of the imaging device 200 to capture an image of any member to be inspected of the bridge 1 having a plurality of members at the time of inspection of the bridge 1.

Though details will be described below, the robot device 100 comprises a main frame 102, a vertical telescopic arm 104, a housing 106 where a drive unit, various control units, and the like of the vertical telescopic arm 104 are provided, an X-direction drive unit 108 (FIG. 5) that moves the housing 106 in a longitudinal direction of the main frame 102 (a direction perpendicular to a longitudinal direction of the main girder 2) (X direction), a Y-direction drive unit 110 (FIG. 5) that moves the entire robot device 100 in the longitudinal direction of the main girder 2 (Y direction), and a Z-direction drive unit 112 (FIG. 5) that makes the vertical telescopic arm 104 expand and contract in a vertical direction (Z direction).

The X-direction drive unit 108 has a ball screw 108A that is provided in the longitudinal direction of the main frame 102 (X direction), a ball nut 108B that is provided in the housing 106, and a motor 108C that rotates the ball screw 108A, and rotates the ball screw 108A in a normal direction or a reverse direction by the motor 108C to move the housing 106 in the X direction.

The Y-direction drive unit 110 has tires 110A and 110B that are provided at both ends of the main frame 102, and motors (not shown) that are provided in the tires 110A and 110B, and drives the tires 110A and 110B by the motors to move the entire robot device 100 in the Y direction.

The robot device 100 is provided in an aspect in which the tires 110A and 110B at both ends of the main frame 102 are disposed on lower flanges of the two main girders 2 and are disposed such that the main girders 2 are sandwiched between the tires 110A and 110B. With this, the robot device 100 can move (be self-propelled) along the main girders 2 while being suspended from the lower flanges of the main girders 2. Though not shown, the main frame 102 is configured such that the length of the main frame 102 can be adjusted according to an interval between the main girders 2.

The vertical telescopic arm 104 is provided in the housing 106 of the robot device 100 and moves in the X direction and the Y direction along with the housing 106. The vertical telescopic arm 104 expands and contracts in the Z direction by the Z-direction drive unit 112 (FIG. 5) provided in the housing 106.

Figure 4:
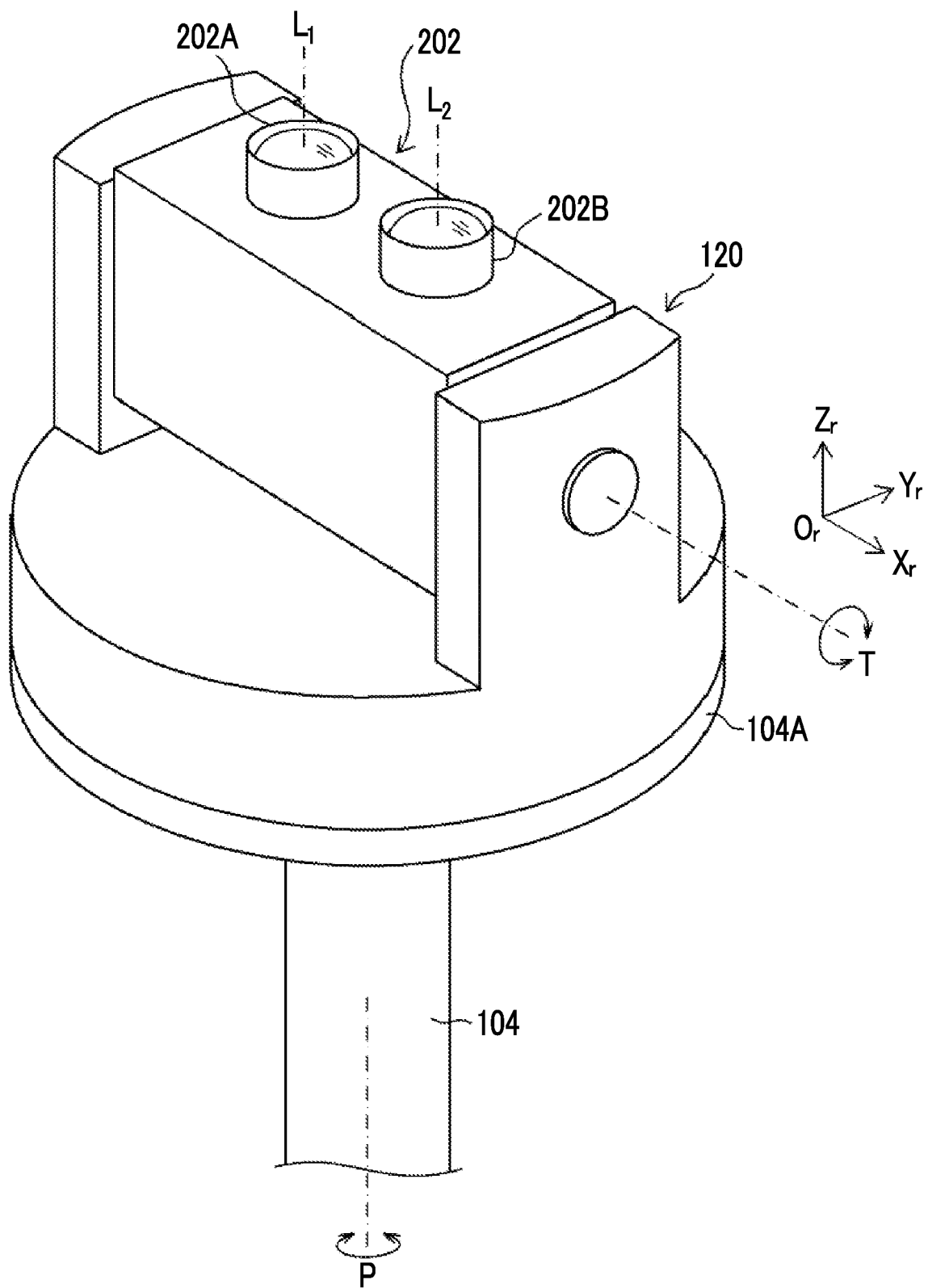
FIG. 4 is an appearance perspective view of a twin-lens camera and a pan/tilt mechanism.

FIG. 4 is an appearance perspective view of the twin-lens camera and a pan/tilt mechanism 120. As shown in FIG. 4, a camera mounting portion 104A is provided at a distal end of the vertical telescopic arm 104, and the twin-lens camera 202 that can be rotated in a pan direction and a tilt direction by the pan/tilt mechanism 120 is provided in the camera mounting portion 104A.

The twin-lens camera 202 has a first imaging unit 202A and a second imaging unit 202B that capture two parallax images (stereoscopic image) with different parallax, acquires space information of a structure (bridge 1) corresponding to an imaging range of the twin-lens camera 202 that is space information of the bridge 1 in a local coordinate system (camera coordinate system) based on the twin-lens camera 202, and acquires at least one image of two images to be captured as an "inspection image" to be attached to an inspection report.

Figure 5:
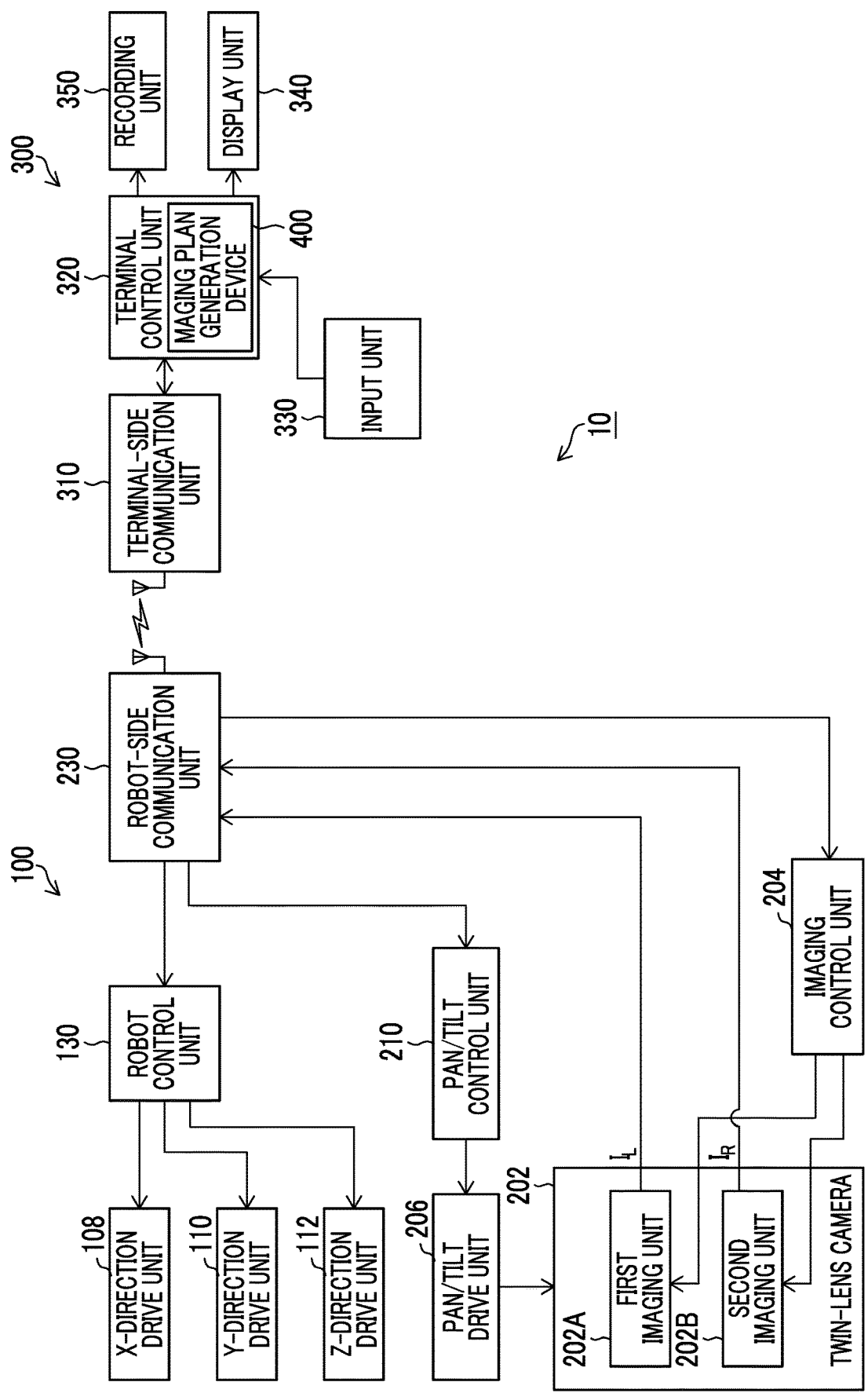
FIG. 5 is a block diagram showing a functional configuration example of an inspection system.

The twin-lens camera 202 is rotated around a pan axis P coaxial with the vertical telescopic arm 104 or is rotated around a tilt axis T in a horizontal direction by the pan/tilt mechanism 120 to which a driving force is applied from a pan/tilt drive unit 206 (FIG. 5). With this, the twin-lens camera 202 can capture images in any posture (capture images in any imaging direction).

An optical axis $L_1$ of the first imaging unit 202A and an optical axis $L_2$ of the second imaging unit 202B of the twin-lens camera 202 of the example are parallel to each other. The pan axis P is perpendicular to the tilt axis T A base line of the twin-lens camera 202 (that is, an interval at which the first imaging unit 202A and the second imaging unit 202B are provided) is known.

The camera coordinate system based on the twin-lens camera 202 has, for example, a cross point of the pan axis P and the tilt axis T as an origin Or, a direction of the tilt axis T as an x-axis direction, a direction of the pan axis P as a z-axis direction, and a direction perpendicular to the x axis and the y axis as a y-axis direction.

A position of the twin-lens camera 202 (a position of the origin Or of the camera coordinate system) that is a position (hereinafter, referred to as an "imaging position") in a global coordinate system (bridge coordinate system) is detected by a global positioning system (GPS) (hereinafter, referred to as a "GPS device"), and can be detected using moving distances of the robot device 100 in the X direction and the Y direction with respect to the origin of the bridge coordinate system and a moving distance of the vertical telescopic arm 104 in the Z direction. The imaging direction of the twin-lens camera 202 is detected by a pan angle α and a tilt angle β of the pan/tilt mechanism 120, and can be detected by an azimuth sensor (not shown) mounted in the twin-lens camera 202.

FIG. 5 is a block diagram showing a functional configuration example of an inspection system 10.

As shown in FIG. 5, the inspection system 10 has a robot control unit 130, the X-direction drive unit 108, the Y-direction drive unit 110, and the Z-direction drive unit 112 on the robot device 100 side, the twin-lens camera 202, an imaging control unit 204, a pan/tilt control unit 210, and the pan/tilt drive unit 206 on the imaging device 200 side, a robot-side communication unit 230, and a terminal device 300.

The robot-side communication unit 230 performs bidirectional wireless communication with a terminal-side communication unit 310, receives various commands, such as a movement command for controlling the movement of the robot device 100, a pan/tilt command for controlling the pan/tilt mechanism 120, and an imaging command for controlling the twin-lens camera 202, transmitted from the terminal-side communication unit 310, and outputs the received commands to the corresponding control units.

The robot control unit 130 controls the X-direction drive unit 108, the Y-direction drive unit 110, and the Z-direction drive unit 112 based on the movement command input from the robot-side communication unit 230, moves the robot device 100 in the X direction and the Y direction, and makes the vertical telescopic arm 104 expand and contract in the Z direction (see FIG. 2).

The pan/tilt control unit 210 operates the pan/tilt mechanism 120 in the pan direction and the tilt direction through the pan/tilt drive unit 206 based on the pan/tilt command input from the robot-side communication unit 230 and makes the twin-lens camera 202 pan and tilt in a desired direction (see FIG. 4). That is, the pan/tilt control unit 210 changes the posture of the camera (imaging device 200) by the pan/tilt mechanism 120 and appropriately acquires captured images.

The imaging control unit 204 makes the first imaging unit 202A and the second imaging unit 202B of the twin-lens camera 202 capture a live view image or an inspection image based on the imaging command input from the robot-side communication unit 230.

Image data indicating a first image $I_L$ and a second image $I_R$ with different parallax captured by the first imaging unit 202A and the second imaging unit 202B of the twin-lens camera 202 at the time of inspection of the bridge 1 and information indicating an imaging position (the position of the origin Or of the camera coordinate system in the bridge coordinate system) and the imaging direction (in the example, a pan angle α and a tilt angle β) of the twin-lens camera 202 are transmitted to the terminal-side communication unit 310 through the robot-side communication unit 230.

The terminal device 300 is operated by an inspector who operates the inspection system 10, and primarily has the terminal-side communication unit 310, a terminal control unit 320, an input unit 330 that functions as an operating unit, a display unit 340, and a recording unit 350. For example, a tablet terminal can be applied to the terminal device 300.

The terminal-side communication unit 310 performs bidirectional wireless communication with the robot-side communication unit 230, receives various kinds of information that are input from the robot-side communication unit 230 (image data indicating the live view image captured by the first imaging unit 202A and the second imaging unit 202B, the first image $I_L$, and the second image $I_R$, and information indicating the imaging position and the imaging direction of the twin-lens camera 202), and transmits various commands according to operations on the input unit 330 input through the terminal control unit 320 to the robot-side communication unit 230.

The terminal control unit 320 outputs image data indicating the live view image received through the terminal-side communication unit 310 to the display unit 340, and makes the display unit 340 display the live view image on the screen of the display unit 340. The input unit 330 has a robot operation input unit, a pan/tilt operation input unit, and an imaging operation input unit, the robot operation input unit outputs the movement command for moving the robot device 100 (twin-lens camera 202) in the X direction, the Y direction, and the Z direction, the pan/tilt operation input unit outputs the pan/tilt command for rotating the pan/tilt mechanism 120 (twin-lens camera 202) in the pan direction and the tilt direction, and the imaging operation input unit outputs the imaging command for instructing the twin-lens camera 202 to capture the inspection image. The inspector manually operates the input unit 330 while viewing the live view image displayed on the display unit 340, and the input unit 330 outputs various commands, such as the movement command of the twin-lens camera 202 in the X direction, the Y direction, and the Z direction, the pan/tilt command, and the imaging command, to the terminal control unit 320 according to the operations of the inspector. The terminal control unit 320 transmits various commands input from the input unit 330 to the robot-side communication unit 230 through the terminal-side communication unit 310.

The terminal control unit 320 has an imaging plan generation device 400. An imaging plan generated by the imaging plan generation device 400 is transmitted to the robot device 100. The robot control unit 130, the pan/tilt mechanism 120, and the imaging control unit 204 are controlled based on the received imaging plan. Hereinafter, the imaging plan generation device 400 will be described.

First Embodiment

First, an imaging plan generation device 400 according to a first embodiment of the invention will be described.

Figure 6:
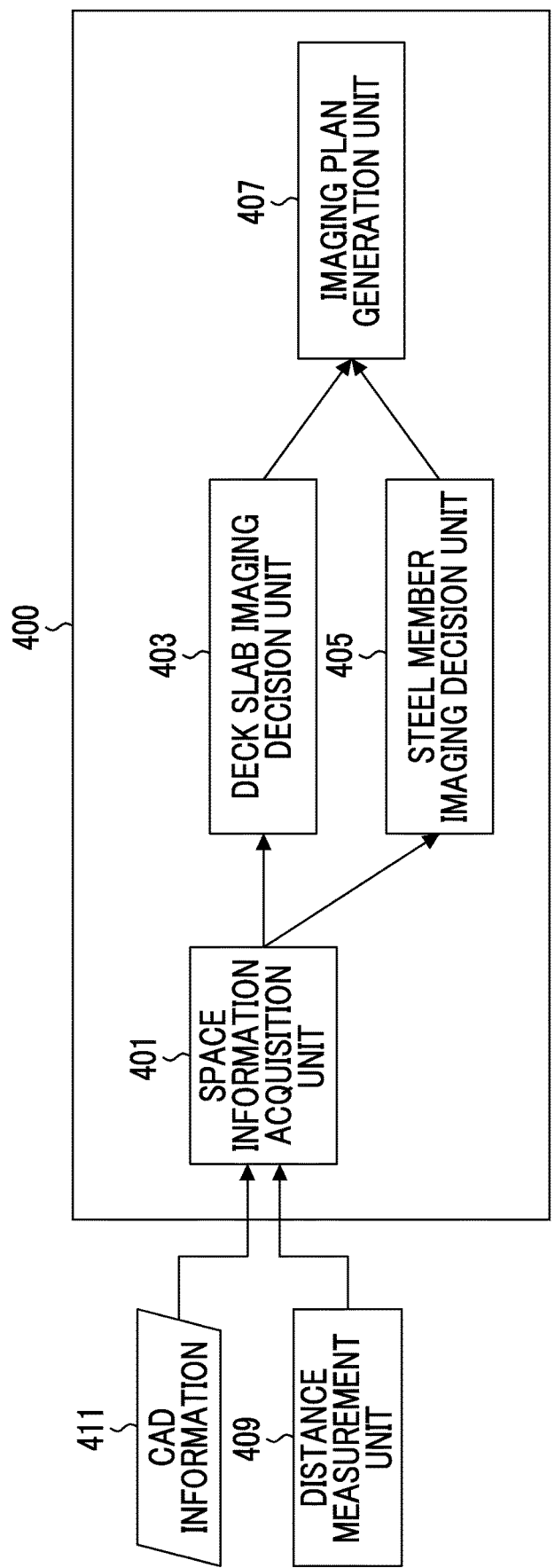
FIG. 6 is a block diagram showing a functional configuration example of an imaging plan generation device.

FIG. 6 is a block diagram showing a functional configuration example of the imaging plan generation device 400 of the embodiment. The imaging plan generation device 400 shown in FIG. 6 comprises a space information acquisition unit 401, a deck slab imaging decision unit (first decision unit) 403, a steel member imaging decision unit (second decision unit) 405, and an imaging plan generation unit 407.

The space information acquisition unit 401 acquires space information of one panel divided by two facing main girders 2 and two facing cross beams 3 or cross frames 4. The space information refers to information indicating the size or position relating to the space of the panel. For example, the space information refers to the three-dimensional coordinates of the panel. The space information acquisition unit 401 can acquire the space information of the panel in various aspects. For example, the space information acquisition unit 401 may acquire the space information based on CAD information (CAD drawing data) 411 of the bridge 1 or may acquire the space information based on distance information measured by a distance measurement unit 409. In a case where the CAD information 411 of the bridge 1 is incorrect or insufficient, the space information acquisition unit 401 may acquire the CAD information 411 of the bridge 1 and may acquire the distance information from the distance measurement unit 409 to acquire the space information.

The deck slab imaging decision unit 403 decides, based on the space information of the panel, a plurality of deck slab imaging positions and deck slab imaging postures of the camera in dividing the entire deck slab 6 corresponding to one panel into a plurality of pieces and imaging a plurality of pieces with the camera. A plurality of deck slab imaging positions are decided to cover the deck slab 6 inside the panel. A plurality of divided captured images may be subjected to panorama composition for each panel, and in this case, the deck slab imaging positions are decided with the captured images including a composition overlap width of panorama composition. The deck slab imaging postures may face the deck slab 6 or may be inclined with respect to the deck slab 6, and are not particularly limited within a range in which imaging is performed to cover the deck slab 6 of the panel. The captured images captured as inclined with respect to the deck slab 6 are made to face the deck slab 6 through image processing. The deck slab imaging positions and the deck slab imaging postures decided by the deck slab imaging decision unit 403 are transmitted to the imaging plan generation unit 407.

The steel member imaging decision unit 405 decides, based on the space information of the panel, a plurality of steel member imaging positions and steel member imaging postures of the camera in imaging at least a plurality of joint portions of the steel members among the steel members corresponding to one panel with the camera. The steel members are members including the main girders 2, the cross beams 3, and the cross frames 4. The steel member imaging decision unit 405 primarily decides the steel member imaging positions and the steel member imaging postures for acquiring the captured images of the joint portions of the steel members. The joint portions of the steel member are connected by nuts or welding, and in the inspection, inspection is performed on the joint portions. The steel member imaging positions and the steel member imaging postures decided by the steel member imaging decision unit 405 are transmitted to the imaging plan generation unit 407.

The imaging plan generation unit 407 generates an imaging plan of the camera-equipped mobile robot based on a plurality of deck slab imaging positions and deck slab imaging postures decided by the deck slab imaging decision unit 403 and a plurality of steel member imaging positions and steel member imaging postures decided by the steel member imaging decision unit 405. The imaging plan generation unit 407 generates an imaging plan such that the robot device 100 can efficiently move and accurately acquire the captured images in one panel. For example, the imaging plan generation unit 407 makes the robot device 100 acquire the captured images of the deck slab 6 using the deck slab imaging positions and the deck slab imaging postures decided by the deck slab imaging decision unit 403 in an outward path, and makes the robot device 100 acquire the captured images of the steel members using the steel member imaging positions and the steel member imaging postures decided by the steel member imaging decision unit 405 in a return path. The imaging positions or the imaging postures inside the panel may be graphically displayed based on the generated imaging plan.

Next, the distance measurement unit 409 will be described. The distance measurement unit 409 measures a first distance to the two facing main girders 2, a second distance to the two facing cross beams 3 or cross frames 4, and a third distance to the deck slab 6 based on a robot initial position S within the three-dimensional space. Then, the space information acquisition unit 401 acquires the space information based on the measured first distance, second distance, and third distance.

FIG. 7 is a diagram illustrating an aspect of distance measurement of the distance measurement unit 409. (A) of FIG. 7 shows designation of a distance measurement position is shown, and (B) of FIG. 7 shows measurement of a distance of a panel 7 within the three-dimensional space divided by the facing main girders 2, the cross beam 3, and the cross frame 4. The imaging device 200 of the robot device 100 described above comprises the twin-lens camera 202, can perform distance measurement, and functions as the distance measurement unit 409. In the example shown in FIG. 7, although a case where distance measurement is performed using a stereo image acquired by the twin-lens camera 202 will be been described, the invention is not limited thereto. For example, a distance may be measured by a laser distance sensor.

In (A) of FIG. 7, a live view image within a panel space displayed on a display unit 340 (FIG. 5) is shown. The panel space is imaged by the twin-lens camera 202 of the imaging device 200 of the robot device 100, and the inspector (user) confirms the live view image of the panel space on the display unit 340 (FIG. 5). Then, the inspector manually inputs and designates the distance measurement position, for example, through the input unit 330. The distance measurement position may be automatically designated through image recognition processing on an image acquired by the twin-lens camera 202 in the deck slab imaging decision unit 403. In (A) of FIG. 7, the distance measurement position in measuring the distance (the (X+) direction of (B) of FIG. 7) between the robot initial position S and the cross frame 4 is shown. In a case where the distance measurement position is manually input and designated, the inspector designates the distance measurement position in the (X−), (Y+), (Y−), and (Z) directions of (B) of FIG. 7 similarly. In a case where the entire captured image is the same plane, the designation of the distance measurement position is not needed.

The robot device 100 measures, based on the designated distance measurement position, the distance (first distance) between the robot initial position S and the cross frame 4 in a case where the twin-lens camera 202 is turned to the (X+) direction, the distance (first distance) between the robot initial position S and the cross beam 3 in a case where the twin-lens camera 202 is turned to the (X−) direction, the distance (second distance) between the robot initial position S and the main girder 2 in a case where the twin-lens camera 202 is turned to the (Y+) and (Y−) directions, and the distance (third distance) between the robot initial position S and the deck slab 6 in a case where the twin-lens camera 202 is turned to the (Z) direction. The robot device 100 transmits the measured distances to the space information acquisition unit 401, and the space information acquisition unit 401 generates and acquire the three-dimensional coordinates of the panel 7 based on received distance information.

Next, the deck slab imaging decision unit 403 will be described in connection with a specific example. The deck slab imaging decision unit 403 acquires space information of the panel 7 from the space information acquisition unit 401 and decides the deck slab imaging positions and the deck slab imaging postures based on the acquired space information.

First, a deck slab imaging range that is calculated by the deck slab imaging decision unit 403 will be described. The deck slab imaging decision unit 403 calculates the deck slab imaging range using the distance between the imaging device 200 and the deck slab 6, a focal length of the twin-lens camera 202, and the size of an imaging element 250 of the camera, and can decide the deck slab imaging positions based on the deck slab imaging range and the space information of the panel 7.

Figure 8:
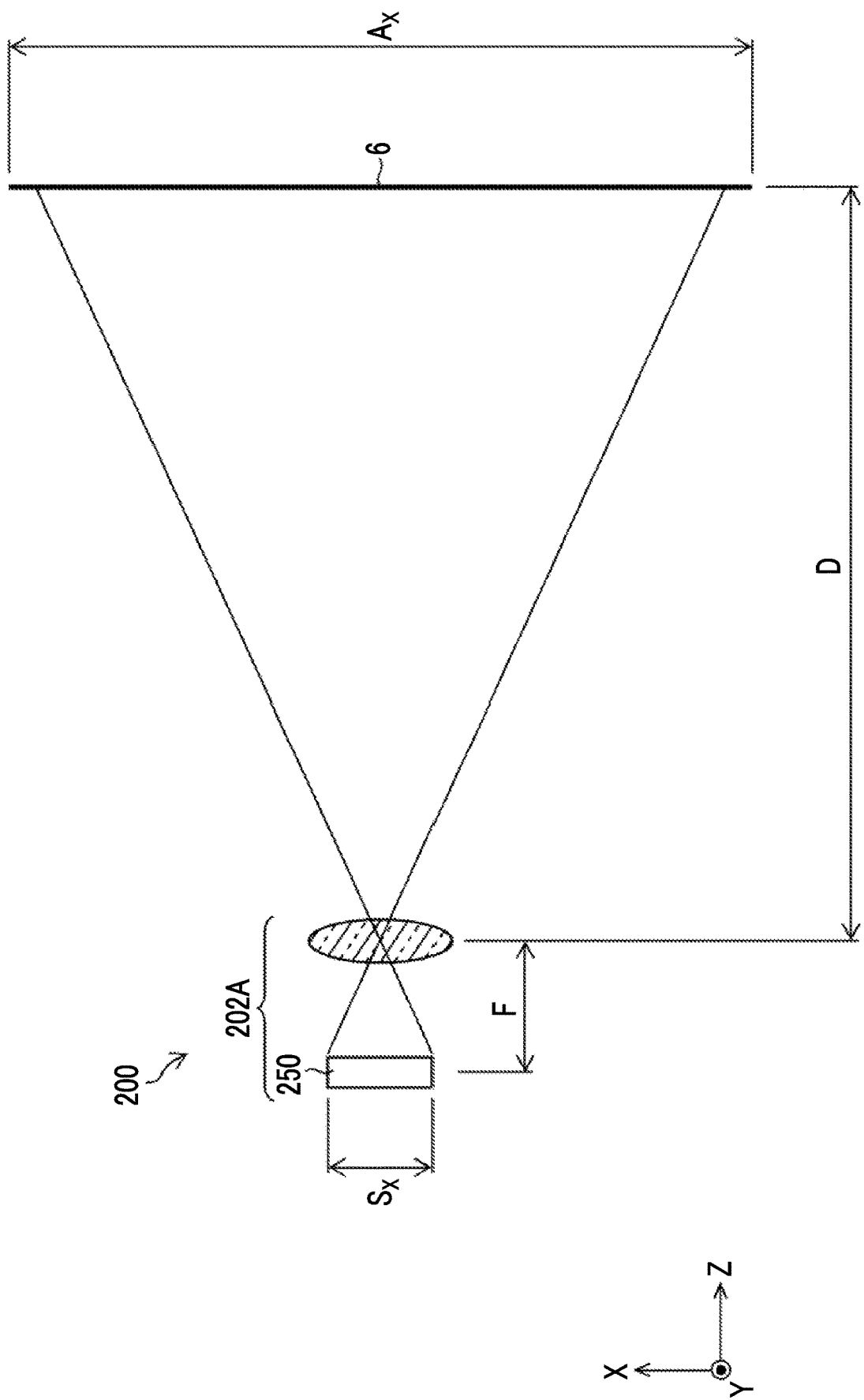
FIG. 8 is a diagram illustrating calculation of a deck slab imaging range.

FIG. 8 is a diagram illustrating the calculation of the deck slab imaging range.

The distance between the imaging device 200 and the deck slab 6 is referred to as D, the focal length of the lens of the first imaging unit 202A is referred to as F, and the size of the imaging element 250 of the imaging device 200 is referred to as Sx×Sy. In this case, the imaging range for the deck slab 6 corresponding to the deck slab images can be calculated as follows. The deck slab images are divided images of the deck slab 6 captured at the deck slab imaging positions.

Imaging range (Ax) of deck slab on X axis=D×Sx/F
Imaging range (Ay) of deck slab on Y axis=D×Sy/F Description will be provided below using a specific example.

It is assumed that the distance between the imaging device 200 and the deck slab 6: D=2100 mm, the focal length: F=27 mm, the imaging element 250 (image sensor (Advanced Photo System (APS)-C)): Sx=23.6 mm, and Sy=15.6 mm.

The deck slab imaging range is as follows under the above-described conditions.

Imaging range (Ax) of deck slab on X axis=1835.6 mm
Imaging range (Ay) of deck slab on Y axis=1213.3 mm The deck slab imaging decision unit 403 calculates the deck slab imaging range as described above and compares the area of the deck slab 6 inside the panel 7 in the space information of the panel 7 with the deck slab imaging range to decide the deck slab imaging positions as the positions whether the deck slab 6 can be imaged comprehensively.

Figure 9:
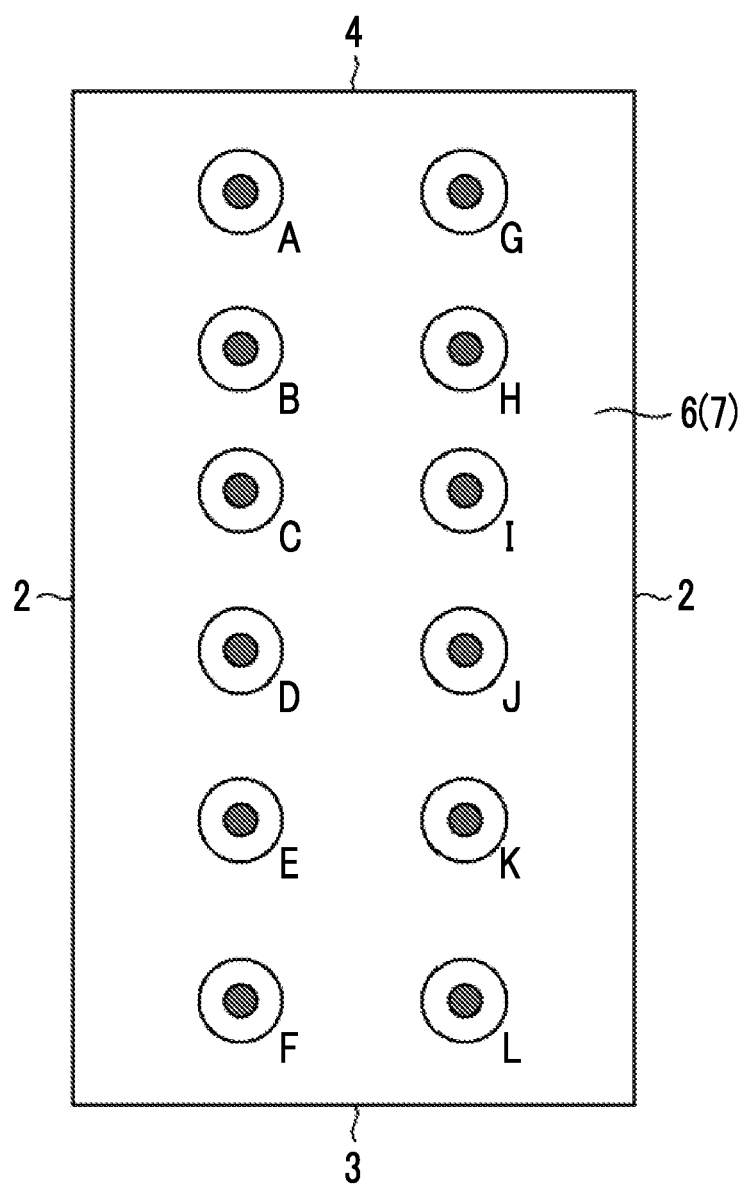
FIG. 9 is a diagram illustrating deck slab imaging positions that are decided by a deck slab imaging decision unit.
Figure 10:
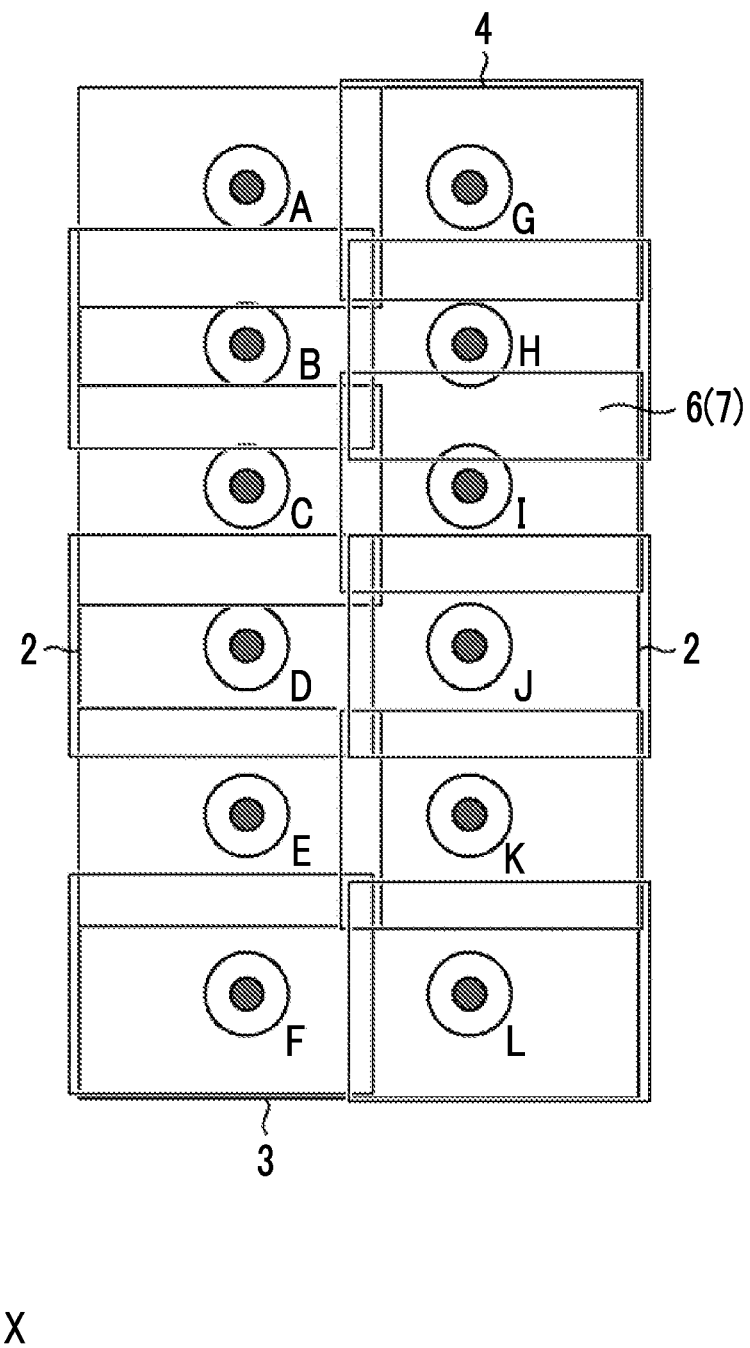
FIG. 10 is a diagram illustrating the deck slab imaging positions that are decided by the deck slab imaging decision unit.

FIGS. 9 and 10 are diagrams illustrating the deck slab imaging positions that are decided by the deck slab imaging decision unit 403. In the cases shown in FIGS. 9 and 10, a case where the imaging device 200 is made to face the deck slab 6 to perform deck slab imaging is shown.

FIG. 9 is a diagram showing the deck slab imaging positions for the deck slab 6 in the panel 7. In the case shown in FIG. 9, deck slab images are decided to be captured at deck slab imaging positions A to L on the deck slab 6 divided by the panel 7.

In the case shown in FIG. 9, the deck slab imaging positions for one panel 7 include the six deck slab imaging positions A to F and the six deck slab imaging positions G to L arranged along on the Y axis, and the deck slab imaging positions arranged two by two along the X axis. The panel 7 has, for example, the size of 5 m in the X-axis direction and 3 m in the Y-axis direction.

FIG. 10 is a diagram illustrating the deck slab imaging positions in a case where the captured deck slab images are subjected to panorama composition. Although the deck slab imaging decision unit 403 decides the deck slab imaging positions such that the entire deck slab 6 can be imaged comprehensively, in a case where the captured deck slab images are subjected to panorama composition, the deck slab imaging decision unit 403 decides the deck slab imaging positions such that a composition overlap width (overlapping portion) with adjacent deck slab images is secured. The composition overlap width may be, for example, 30% at both ends of the deck slab images. Since a minimum amount of the composition overlap width to be secured depends on a composition algorithm, it is desirable that the minimum amount of the composition overlap width to be secured can be changed.

Next, the steel member imaging decision unit 405 will be described in connection with a specific example. The steel member imaging decision unit 405 acquires the space information of the panel 7 from the space information acquisition unit 401 and decides the deck slab imaging positions and the deck slab imaging postures based on the acquired space information.

FIGS. 11 and 12 are diagrams illustrating the steel member imaging decision unit 405. In FIGS. 11 and 12, a stereoscopic conceptual diagram of the panel 7 is shown in (A), and a planar conceptual diagram of the panel 7 is shown in (B).

FIG. 11 is a diagram illustrating steel member imaging positions at a lower end (in (A) of FIG. 11, shown in a dot pattern) of the panel 7 as an imaging target in the Z-axis direction. In (B) of FIG. 11, steel member imaging positions M to U are shown by arrows. In this way, the steel member imaging positions are primarily imaging positions where joint portions of the steel members are imaged. Specifically, a joint portion of the main girder 2 and the cross frame 4 is imaged at the steel member imaging position M, and a joint portion of the main girder 2 and the cross beam 3 is imaged at the steel member imaging position Q. A joint portion of the cross frame 4 and the lateral frame 5 is imaged at the steel member imaging position N, and a joint portion of the main girder 2 and the lateral frame 5 is imaged at the steel member imaging position O. A joint portion of the cross beam 3 and the lateral frame 5 is imaged at the steel member imaging position R, and a joint portion of the main girder 2 and the lateral frame 5 is imaged at the steel member imaging position S. A joint portion of the lateral frames 5 is imaged at the steel member imaging position P. and joint portions of the lateral frames 5 and the main girder 2 are imaged at the steel member imaging positions T and U. The steel member imaging positions T and U may not be set depending on inspection and the type of the bridge 1. The example shown in FIG. 11 describes the steel member imaging positions in a case where the lateral frame 5 is provided at the lower end of the panel 7 in the Z-axis direction. In a case where the lateral frame 5 is not provided at the lower end of the panel 7 in the Z-axis direction, the steel member imaging positions are the same as steel member imaging positions of FIG. 12 described below.

FIG. 12 is a diagram illustrating steel member imaging positions at an upper end of the panel 7 as an imaging tart in the Z-axis direction. In FIG. 12, steel member imaging positions V to Y are shown by arrows. Specifically, joint portions of the main girders 2 and the cross frame 4 are imaged at the steel member imaging positions V and W, and joint portions of the main girders 2 and the cross beam 3 are imaged at the steel member imaging positions X and Y.

The steel member imaging decision unit 405 also decides steel member imaging postures at the steel member imaging positions. In regards to the steel member imaging postures, parameters of the pan/tilt mechanism 120 are decided such that the joint portions of the steel members are imaged.

Figure 13:
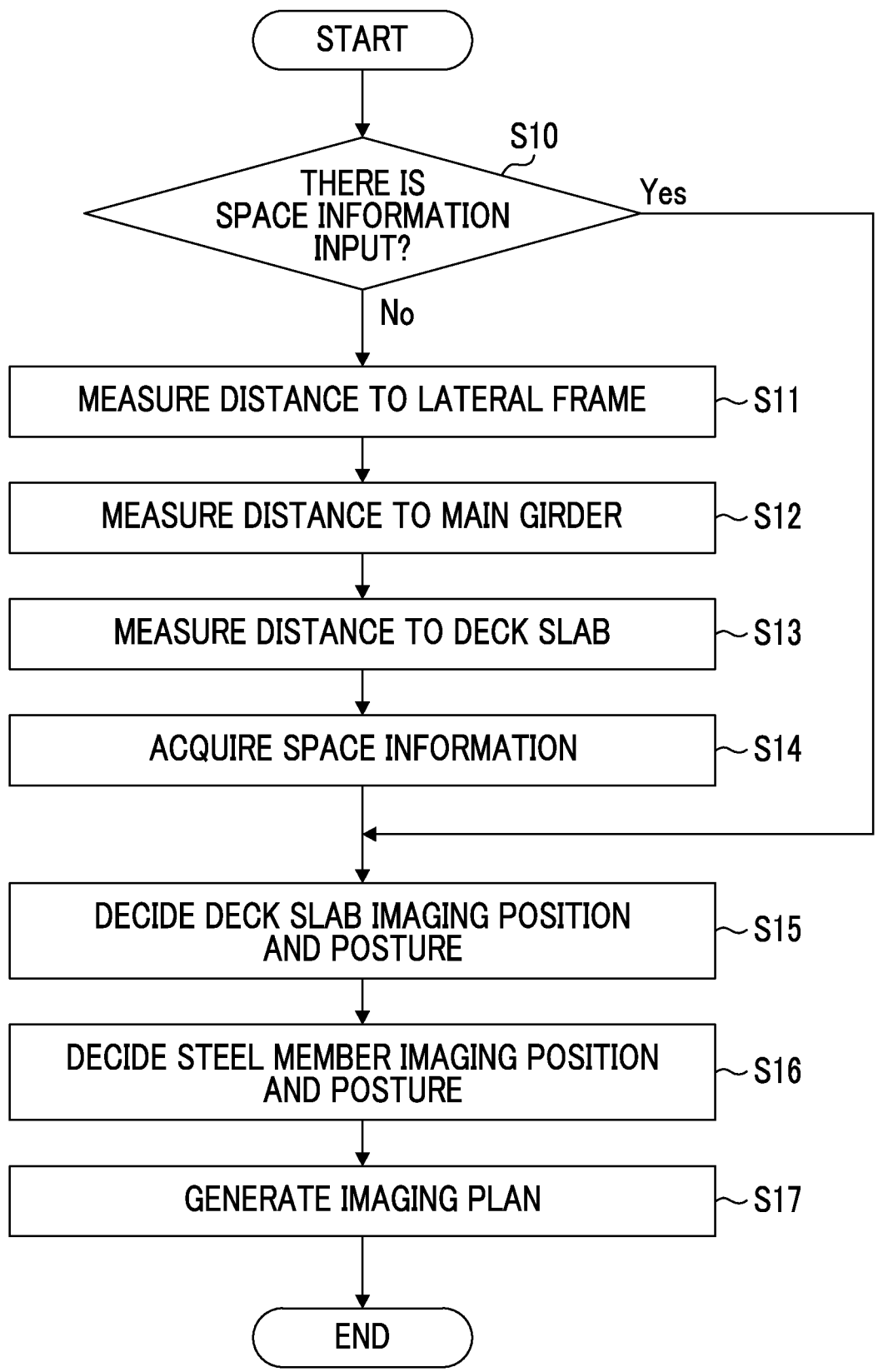
FIG. 13 is a flowchart showing an operation of the imaging plan generation device.

FIG. 13 is a flowchart showing an operation of the imaging plan generation device 400.

First, the space information acquisition unit 401 determines whether or not the space information is input based on the CAD information 411 (Step S10). In a case where the space information based on the CAD information 411 is input, the deck slab imaging positions and postures are decided by the deck slab imaging decision unit 403 based on the input space information (Step S15).

In a case where the space information is not input to the space information acquisition unit 401, the distance between the facing cross beams 3 forming the panel 7 and the initial position is measured by the distance measurement unit 409 (Step S11), the distance between the facing main girders 2 forming the panel 7 and the initial position is measured (Step S12), and the distance between the initial position and the deck slab 6 is measured (Step S13).

Thereafter, the space information acquisition unit 401 acquires the distance to the cross beams 3, the distance to the main girders 2, and the distance to the deck slab 6 from the distance measurement unit 409. Thereafter, the space information acquisition unit 401 acquires the space information based on the acquired distance information (space information acquisition step: Step S14).

Thereafter, the deck slab imaging decision unit 403 decides the deck slab imaging positions and postures based on the acquired space information (first decision step: Step S15). Thereafter, the steel member imaging decision unit 405 decides the steel member imaging positions and postures (second decision step: Step S16). Then, the imaging plan generation unit 407 generates the imaging plan based on the decision of the deck slab imaging decision unit 403 and the decision of the steel member imaging decision unit 405 (imaging plan generation step: Step S17).

The above-described configurations and functions can be appropriately implemented by any hardware, software, or combinations of hardware and software. For example, the invention can be applied to a program that causes a computer to execute the above-described processing steps (processing procedure), a computer-readable recording medium (non-transitory recording medium) having the program recorded thereon, or a computer on which the program can be installed.

Second Embodiment

Figure 14:
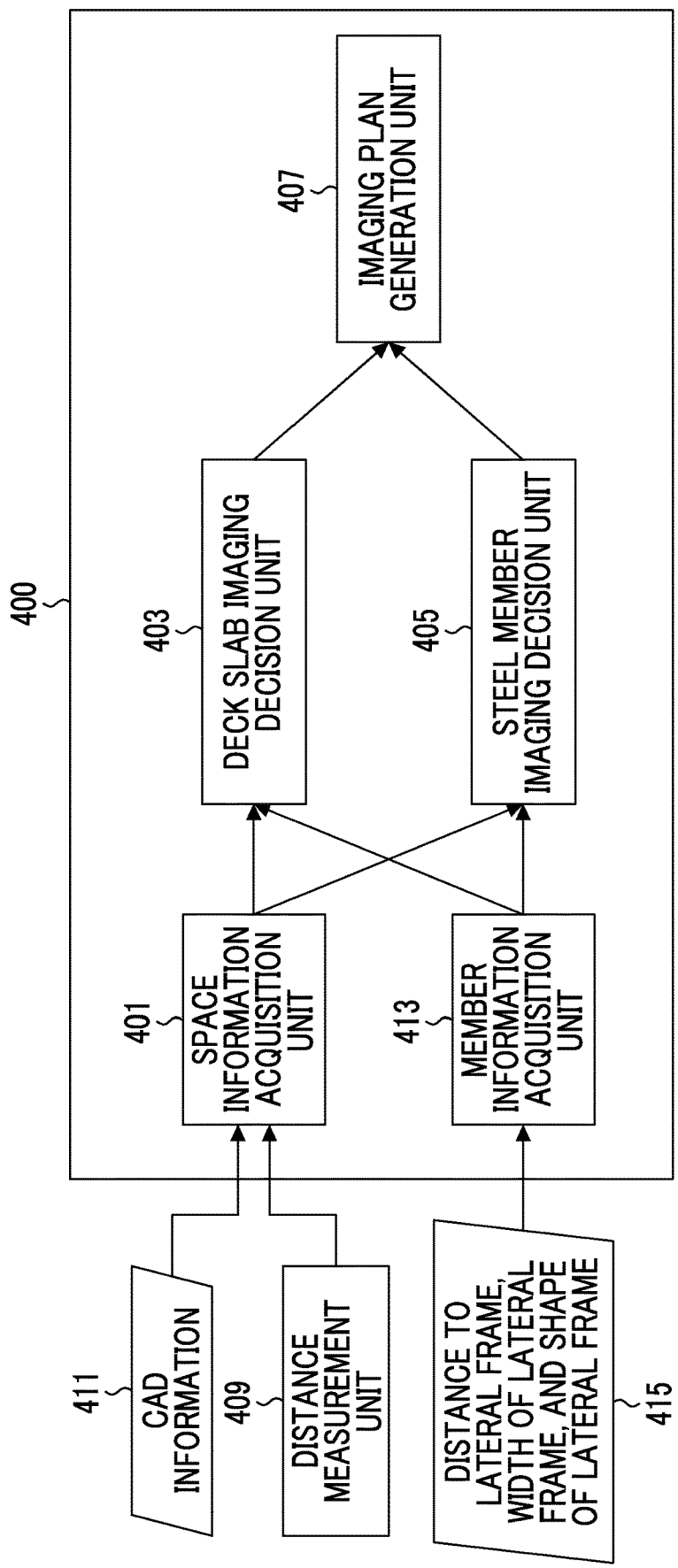
FIG. 14 is a block diagram showing a functional configuration example of the imaging plan generation device.

Next, a second embodiment of the invention will be described. FIG. 14 is a block diagram showing a functional configuration example of an imaging plan generation device 400 of the embodiment. The imaging plan generation device 400 shown in FIG. 14 comprises a space information acquisition unit 401, a deck slab imaging decision unit 403, a steel member imaging decision unit 405, an imaging plan generation unit 407, and a member information acquisition unit 413. The parts already described referring to FIG. 6 are represented by the same reference numerals, and description thereof will not be repeated.

The member information acquisition unit 413 acquires member information as information relating to a member of the panel 7. The member information acquired by the member information acquisition unit 413 is transmitted to the deck slab imaging decision unit 403 and the steel member imaging decision unit 405. Then, the deck slab imaging decision unit 403 decides the imaging positions and postures for the deck slab 6 based on the space information of the panel 7 and the member information, and the steel member imaging decision unit 405 decides the imaging positions and postures for the steel members based on the space information of the panel 7 and the member information.

The member information is, for example, information 415 relating to the lateral frame 5. Information 415 relating to the lateral frame 5 is, for example, information relating to the distance (fourth distance) between the robot initial position S and the lateral frame 5, the width of the lateral frame 5, and the shape of the lateral frame 5. The member information may be input by the user or may be measured by the twin-lens camera 202 of the imaging device 200 of the robot device 100 similarly to when the space information inside the panel 7 is acquired. The shape of the lateral frame 5 is, for example, a "left angle bracket" shape, a "right angle bracket" shape, or the like. The deck slab imaging decision unit 403 and the steel member imaging decision unit 405 decide the imaging positions and the imaging postures based on the space information. The member information includes not only information of the lateral frame 5 but also information relating to other members. For example, information relating to a pipe inside the panel 7 is input as the member information.

Figure 15:
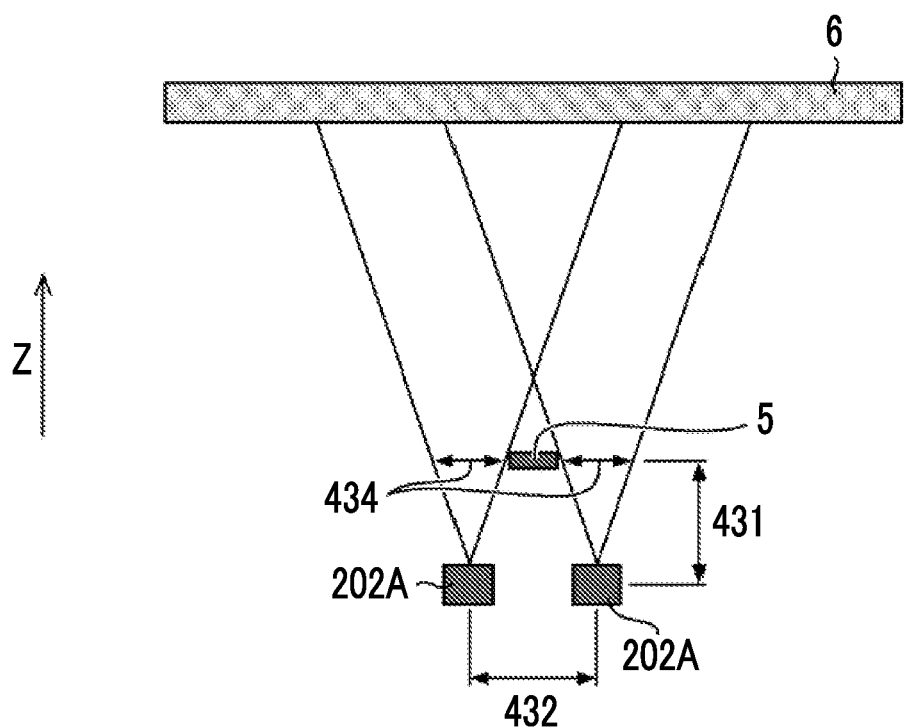
FIG. 15 is a diagram illustrating decision of deck slab imaging positions in a case where a lateral frame is present.
Figure 16:
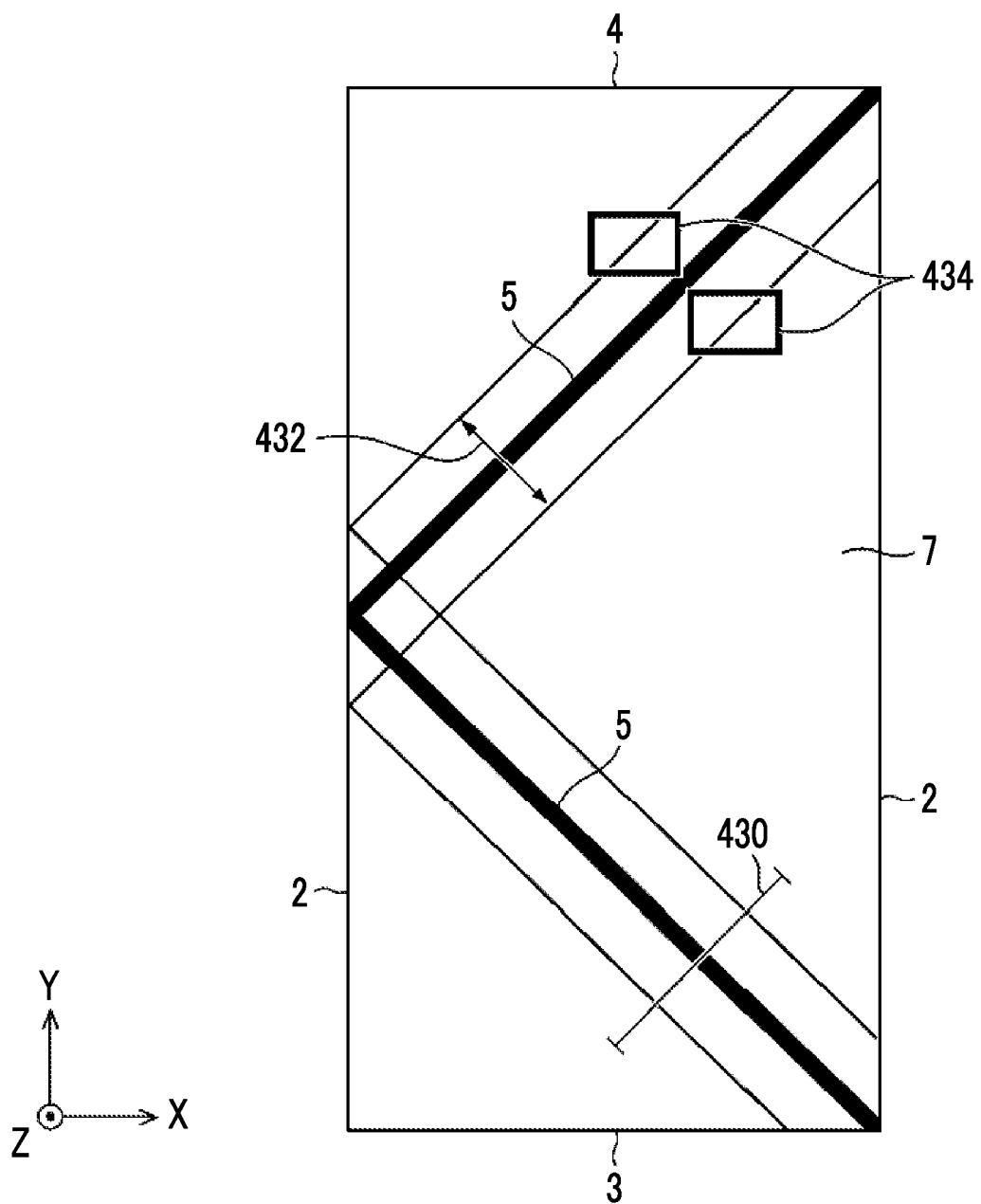
FIG. 16 is a diagram illustrating the decision of the deck slab imaging positions in a case where the lateral frame is present.

Next, the decision of the deck slab imaging positions in the deck slab imaging decision unit 403 in a case where the lateral frame 5 as a specific example of the member is present will be described. FIGS. 15 and 16 are diagrams illustrating the decision of the deck slab imaging positions in a case where the lateral frame 5 having a "left angle bracket" shape is present. FIG. 15 is a diagram of the bridge 1 when viewed from the X-Y direction, and shows the arrangement of the deck slab 6, the lateral frame 5, and the first imaging unit 202A in the Z-axis direction (vertical direction). FIG. 16 is a diagram of the panel 7 of the bridge 1 when viewed from the Z-axis direction, and shows a case where the lateral frame 5 having a "left angle bracket" shape is present inside the panel 7. In FIG. 16, a horizontal plane imaging range 434 and a lateral frame imaged region 432 of the lateral frame 5 are shown. FIG. 15 is a diagram of a cross-section 430 shown in FIG. 16.

The deck slab imaging decision unit 403 calculates the horizontal plane imaging range 434 as an imaging range in the horizontal plane of the lateral frame 5 using the distance 431 to the lateral frame 5, the focal length of the camera, and the size of the imaging element 250 of the camera, and decides the imaging positions and postures for the deck slab 6 based on the space information of the panel 7, the member information, and the horizontal plane imaging range 434. Hereinafter, the deck slab imaging decision unit 403 of the example will be specifically described.

First, the deck slab imaging decision unit 403 calculates the deck slab imaging range as described referring to FIG. 8. Thereafter, as shown in FIG. 15, the deck slab imaging decision unit 403 calculates the horizontal plane imaging range 434 as the imaging range in the horizontal plane of the lateral frame 5 using the distance between the robot initial position S and the lateral frame 5, the focal length of the twin-lens camera 202, and the size of the imaging element 250 of the twin-lens camera 202 by the same method as the deck slab imaging range describe referring to FIG. 8. Thereafter, the deck slab imaging decision unit 403 calculates the lateral frame imaged region 432. The lateral frame imaged region 432 is decided based on the imaging position in the lateral frame horizontal plane where the lateral frame 5 is shown (FIG. 15). In FIG. 15, a case where the twin-lens camera 202 faces the deck slab 6 and the lateral frame 5 is shown.

As shown in FIG. 16, a given region along the lateral frame 5 becomes the lateral frame imaged region 432. Then, the deck slab imaging decision unit 403 decides the deck slab imaging positions within a range outside the lateral frame imaged region 432 to allow the entire deck slab to be comprehensively imaged without being obstructed by the lateral frame 5. The deck slab imaging decision unit 403 decides the deck slab imaging positions where the composition overlap width in a case where panorama composition is performed can be secured as needed.

Figure 17:
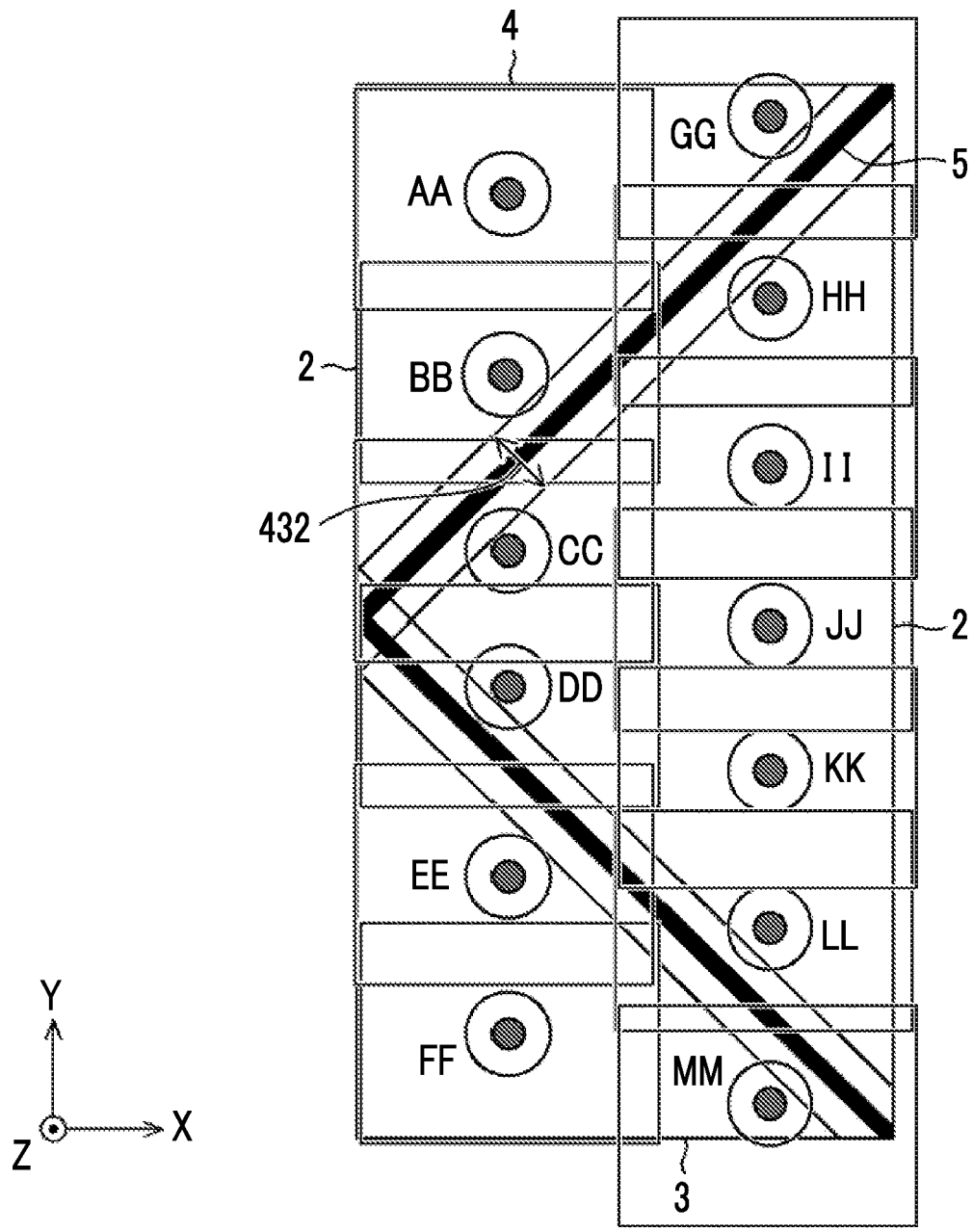
FIG. 17 is a diagram showing the deck slab imaging positions in a case where the lateral frame is present.

FIG. 17 is a diagram showing deck slab imaging positions AA to MM in a case where the lateral frame 5 is present. Since the deck slab imaging positions AA to MM are not positioned within the lateral frame imaged region 432, the deck slab 6 is imaged at the deck slab imaging positions AA to MM, whereby it is possible to image the deck slab 6 comprehensively while restraining the lateral frame 5 from being shown in the deck slab images. In comparison of the deck slab imaging positions in a case where the lateral frame 5 is absent described referring to FIG. 10 with the deck slab imaging positions in a case where the lateral frame 5 is present described referring to FIG. 17, while the number of deck slab imaging positions is 12 in a case where the lateral frame 5 is absent, the number of deck slab imaging positions is 13 in a case where the lateral frame 5 is present.

The deck slab imaging decision unit 403 adds an imaging point for supplementing an unimaged portion as needed. In this case, in a case where the entire deck slab cannot be covered only with the movement of the imaging device 200 in the horizontal direction (X-Y direction), an imaging point to which the imaging device 200 is moved in the vertical direction (Z direction) is added.

Third Embodiment

Figure 18:
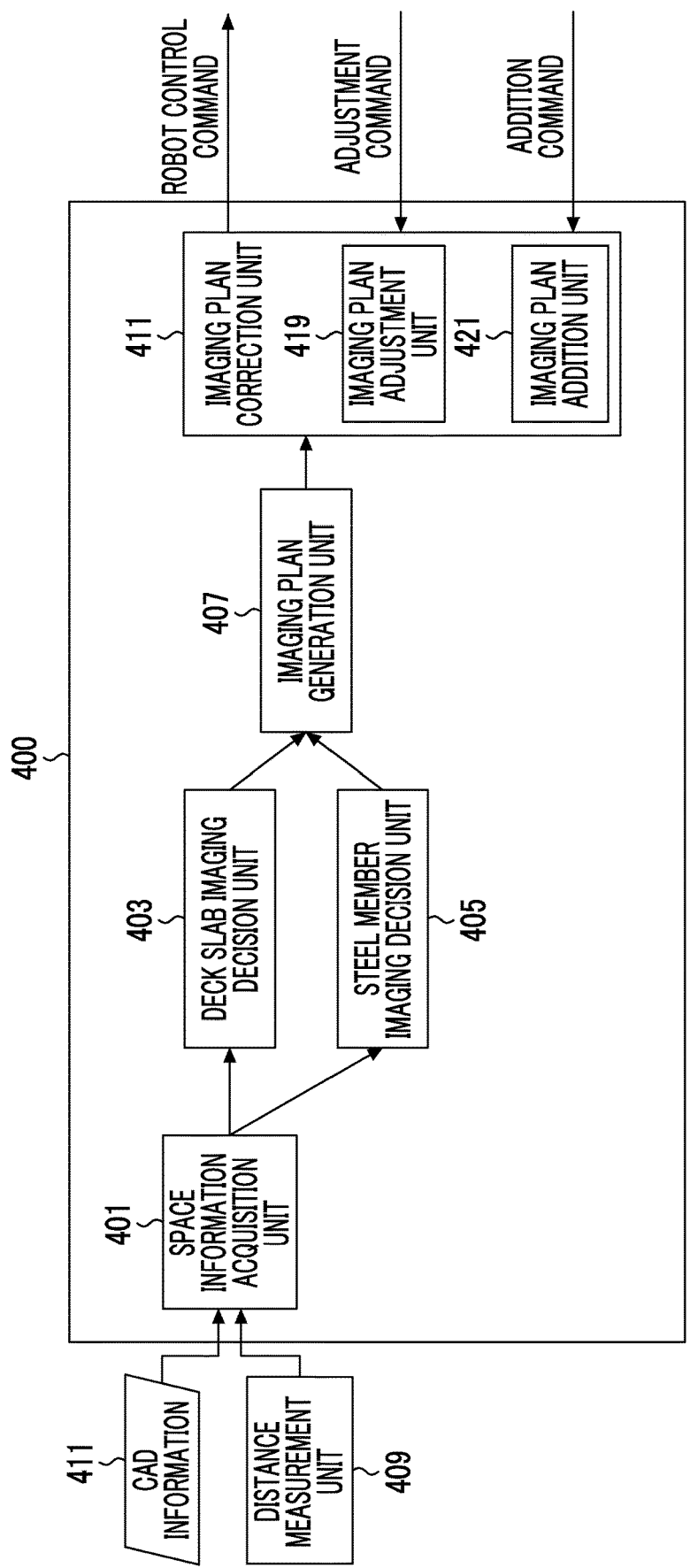
FIG. 18 is a diagram showing a functional configuration example of the imaging plan generation device.

Next, a third embodiment of the invention will be described. FIG. 18 is a diagram showing a functional configuration example of an imaging plan generation device 400 of the embodiment. The imaging plan generation device 400 shown in FIG. 18 comprises a space information acquisition unit 401, a deck slab imaging decision unit 403, a steel member imaging decision unit 405, an imaging plan generation unit 407, and an imaging plan correction unit 417.

The imaging plan correction unit 417 corrects the imaging plan generated by the imaging plan generation unit 407. For example, the imaging plan correction unit 417 optimizes an imaging sequence such that a total imaging time or a total moving distance becomes the shortest. The imaging plan correction unit 417 includes an imaging plan adjustment unit 419 and an imaging plan addition unit 421.

The imaging plan adjustment unit 419 adjusts the deck slab imaging positions or the steel member imaging positions and postures in the imaging plan generated by the imaging plan generation unit 407 based on an adjustment command. The adjustment command is received by, for example, an adjustment command reception unit (not shown), and is a command for adjusting the deck slab imaging positions, the deck slab imaging postures, the steel member imaging positions, or the steel member imaging postures. The adjustment command reception unit is implemented by, for example, the input unit 330.

The imaging plan addition unit 421 receives an addition command of the deck slab imaging positions or the steel member imaging positions. The addition command is received by, for example, an addition command reception unit (not shown), and the deck slab imaging positions or the steel member imaging positions are added to the imaging plan generated by the imaging plan generation unit 407 based on the addition command. The addition command reception unit is implemented by, for example, the input unit 330.

Figure 19:
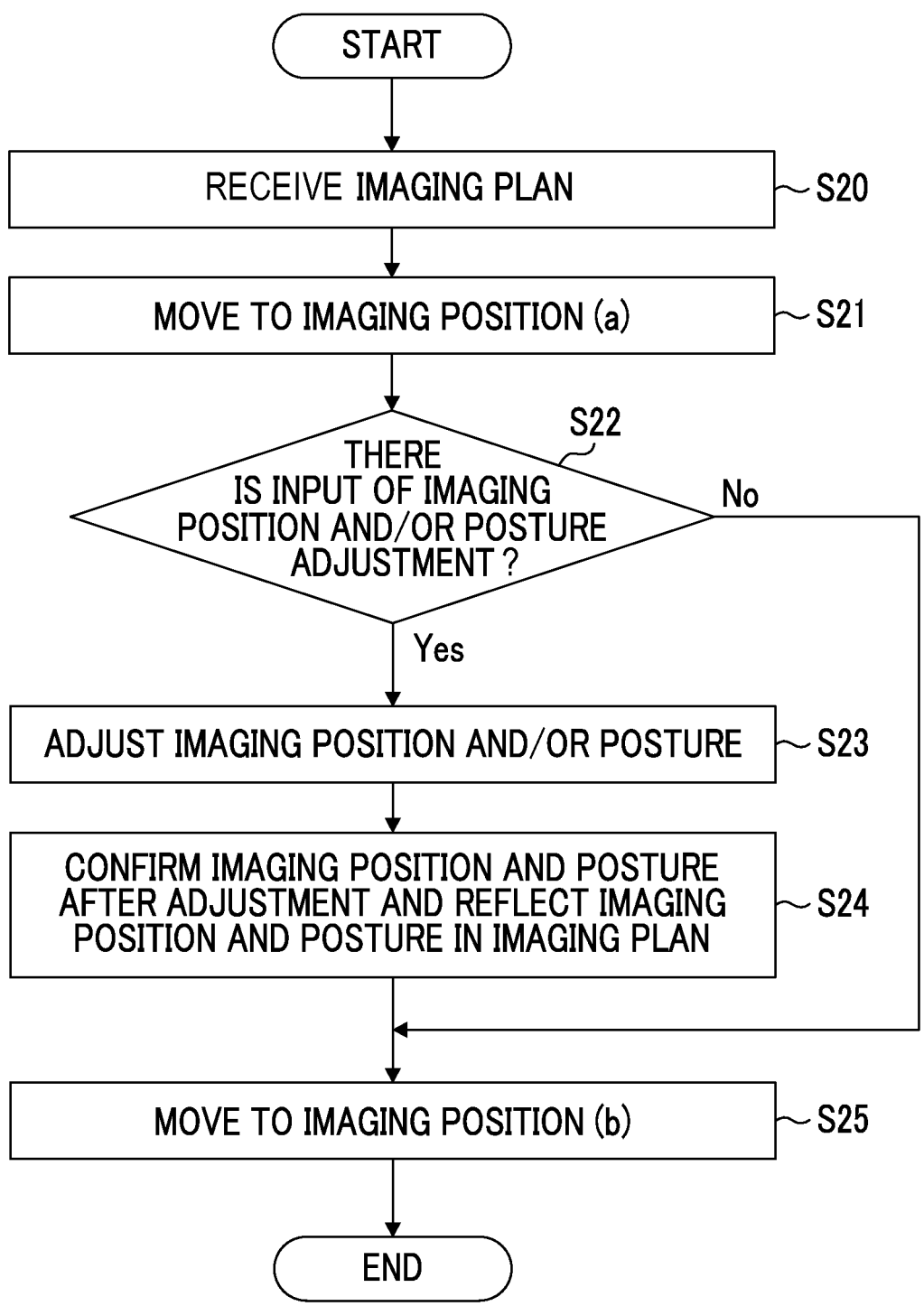
FIG. 19 is a flowchart showing operations of a robot device and the imaging plan generation device of the embodiment.
Figure 20:
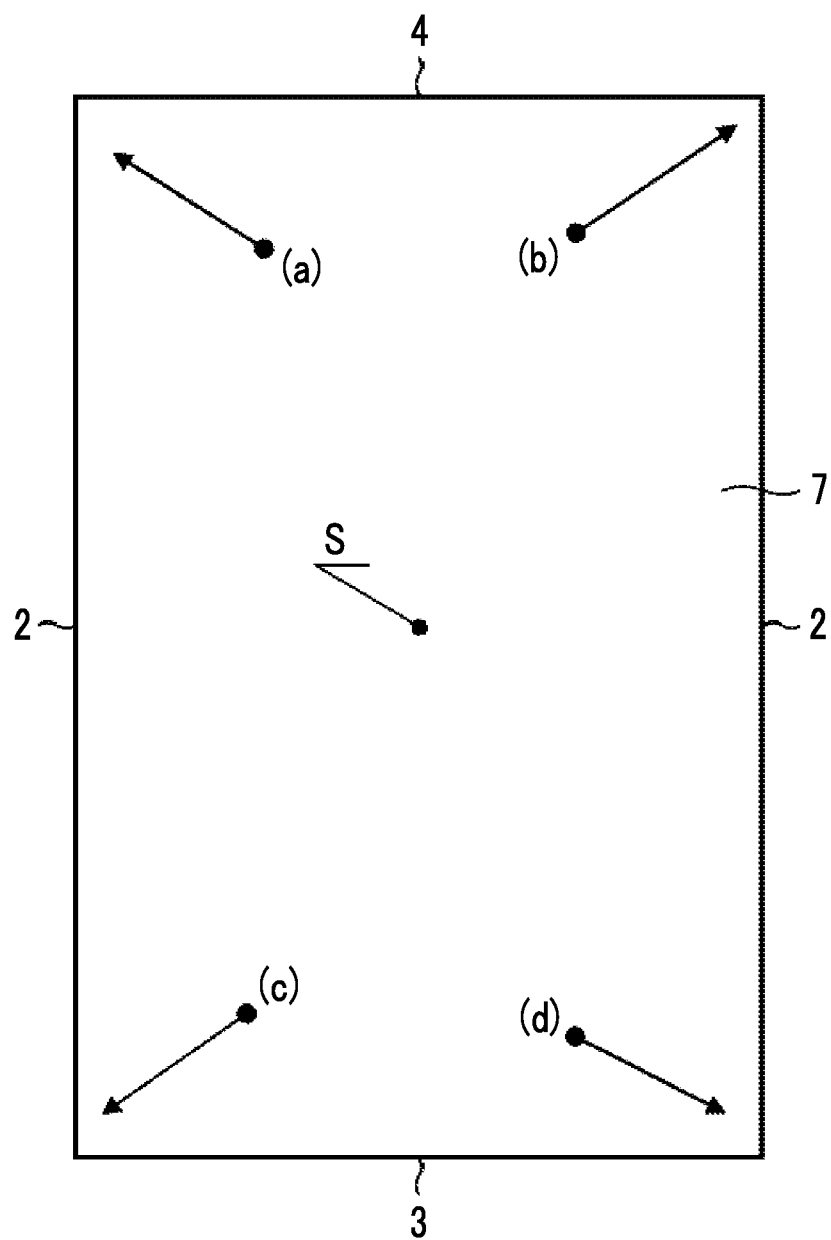
FIG. 20 is a diagram showing an imaging plan.

FIG. 19 is a flowchart showing the operations of the robot device 100 and the imaging plan generation device 400 of the embodiment in a case where the imaging plan is corrected. FIG. 20 is a diagram showing the imaging plan described referring to FIG. 19.

First, the robot device 100 receives the imaging plan generated by the imaging plan generation device 400 through the robot-side communication unit 230 (Step S20), and operates the robot control unit 130, the pan/tilt control unit 210, and the imaging control unit 204 according to the received imaging plan. In the received imaging plan, first, since steel members are imaged according to an imaging position (a), the robot device 100 is moved from the robot initial position S to the imaging position (a) (Step S21) (see FIG. 20). Next, the imaging plan correction unit 417 determines whether or not the adjustment command of the steel member imaging positions and/or the steel member imaging postures is input (Step S22). In a case where the imaging plan correction unit 417 determines that the adjustment command is not input, the robot control unit 130, the pan/tilt control unit 210, and the imaging control unit 204 make the robot device 100 be moved to an imaging position (b) (Step S25).

In a case where the imaging plan correction unit 417 determines that the adjustment command is input, the steel member imaging positions and/or the steel member imaging postures are adjusted through the input unit 330 (Step S23). That is, the user confirms the steel members imaged by the twin-lens camera 202 with the live view image on the display unit 340 when the robot device 100X) is moved to the imaging position (a), and inputs the adjustment command of the steel member imaging positions and/or the steel member imaging postures through the input unit 330. Then, the steel member imaging positions and the steel member imaging postures after the adjustment are established, and the imaging plan correction unit 417 makes the adjustment be reflected in the imaging plan (Step S24). Thereafter, the robot device 100 is moved to the imaging position (b) according to the imaging plan (Step S25).

As described above, while the imaging positions and the imaging postures are adjusted, the steel member images are sequentially captured at the imaging positions (a), (b), (c), and (d) according to the received imaging plan as shown in FIG. 20.

Fourth Embodiment

Figure 21:
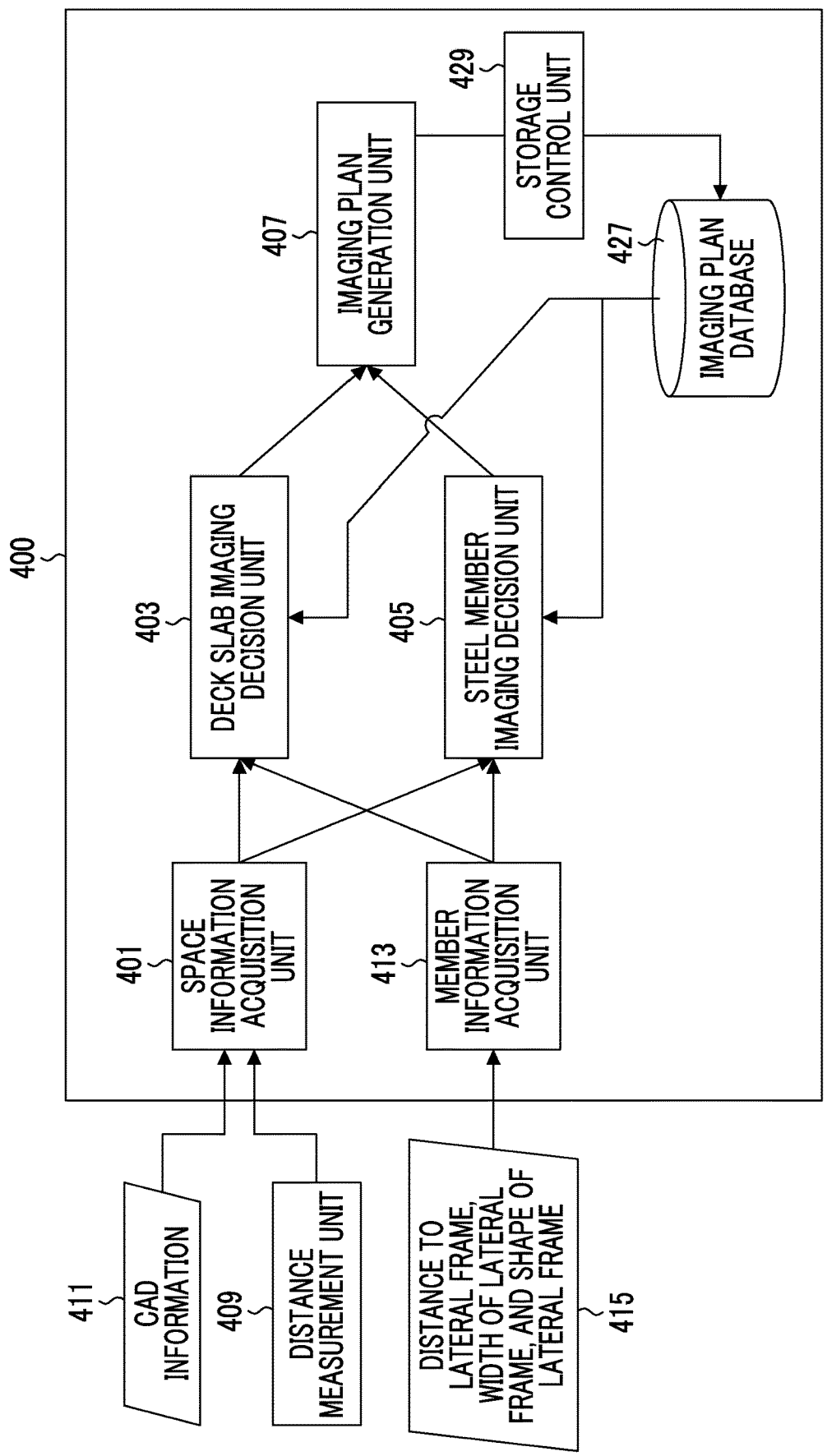
FIG. 21 is a diagram showing a functional configuration example of the imaging plan generation device.

Next, a fourth embodiment will be described. FIG. 21 is a diagram showing a functional configuration example of an imaging plan generation device 400 of the embodiment. The imaging plan generation device 400 shown in FIG. 21 comprises a space information acquisition unit 401, a deck slab imaging decision unit 403, a steel member imaging decision unit 405, an imaging plan generation unit 407, a member information acquisition unit 413, an imaging plan database 427, and a storage control unit 429. The parts already described referring to FIGS. 6 and 14 are represented by the same reference numerals, and description thereof will not be repeated.

The imaging plan database 427 stores a plurality of existing imaging plans. The imaging plan database 427 stores previously generated imaging plans or templates of the imaging plans. The imaging plan database 427 stores the imaging plan generated by the imaging plan generation unit 407. The imaging plan database 427 may store a bridge name, a panel number, a panel size, member information, and the like in association with the imaging plan.

The storage control unit 429 makes the imaging plan database 427 store the imaging plan generated by the imaging plan generation unit 407. As described above, in a case where the imaging plan database 427 stores the imaging plan generated by the imaging plan generation unit 407, the generated imaging plan is stored in the imaging plan database 427 under the control of the storage control unit 429.

The deck slab imaging decision unit 403 of the embodiment selects the existing imaging plan from the imaging plan database 427 based on the space information of the panel 7 and decides the deck slab imaging positions based on the selected existing imaging plan.

The steel member imaging decision unit 405 of the embodiment selects the existing imaging plan from the imaging plan database 427 based on the space information of the panel 7 and decides the steel member imaging positions and postures based on the selected existing imaging plan.

The imaging plan generation unit 407 corrects the deck slab imaging positions decided by the deck slab imaging decision unit 403 and the steel member imaging position and postures decided by the steel member imaging decision unit 405 based on the difference between the space information acquired by the space information acquisition unit 401 and the space information of the selected imaging plan or the difference between the member information acquired by the space information acquisition unit 401 and the member information of the selected imaging plan. That is, the imaging plan generation unit 407 corrects the existing imaging plan stored in the imaging plan database 427 based on the space information or the member information. In this case, in the existing imaging plan stored in the imaging plan database 427, the space information and the member information on the imaging plan are stored in association with the imaging plan.

<Robot Devices of Other Examples>

In the above description, although the robot device 100 (FIG. 2) has been described as an example of the camera-equipped mobile robot, the camera-equipped mobile robot of the invention is not limited thereto.

Figure 22:
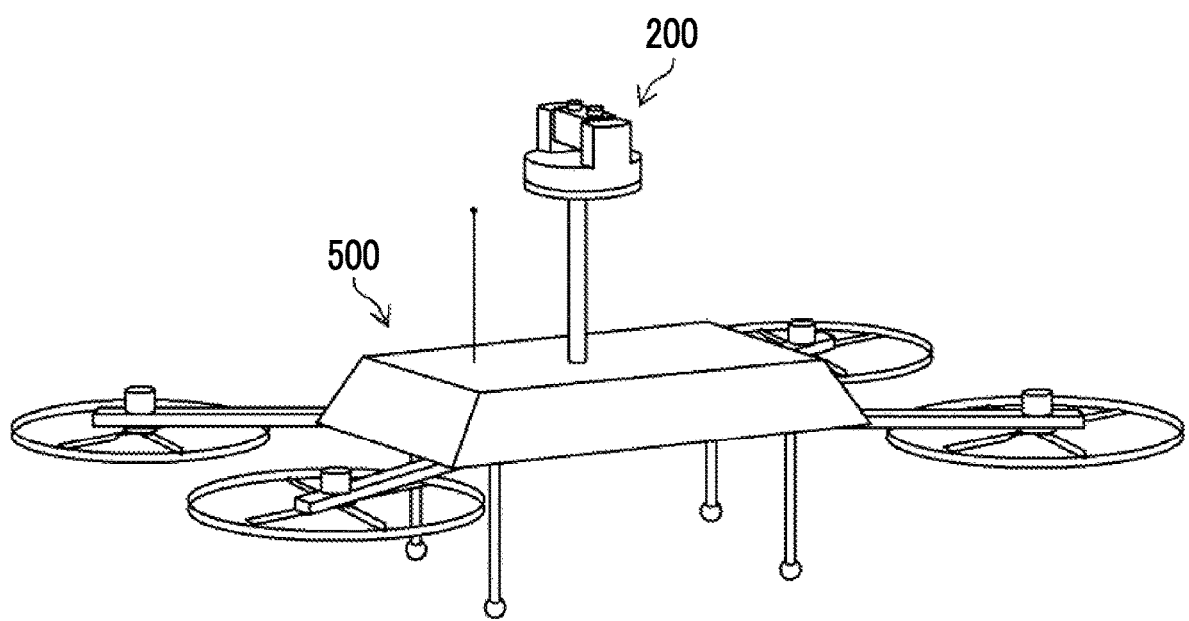
FIG. 22 is a diagram showing another example of a camera-equipped mobile robot.

FIG. 22 is a diagram showing the appearance of an unmanned flying object (drone) as another example of a camera-equipped mobile robot. An unmanned flying object 500 comprises the imaging device 200 (FIG. 4). The unmanned flying object 500 images an inspection target based on the imaging plan generated by the imaging plan generation device 400 described above. The imaging device 200 in the unmanned flying object 500 is moved within the three-dimensional space by the unmanned flying object 500, and the imaging posture of the imaging device 200 is changed by the pan/tilt mechanism 120. Even in the unmanned flying object 500, the inspection system 10 described referring to FIG. 5 is applied.

Although the example of the invention has been described above, the invention is not limited to the above-described embodiments, and may have various modifications without departing from the spirit of the invention.

EXPLANATION OF REFERENCES

1: bridge
2: main girder
3: cross beam
4: cross frame
5: lateral frame
6: deck slab
7: panel
10: inspection system
100: robot device
102: main frame
104: vertical telescopic arm
104A: camera mounting portion
106: housing
108: X-direction drive unit
108A: ball screw
108B: ball nut
108C: motor
110: Y-direction drive unit
110A: tire
110B: tire
112: Z-direction drive unit
120: pan/tilt mechanism
130: robot control unit
200: imaging device
202: twin-lens camera
202A: first imaging unit
202B: second imaging unit
204: imaging control unit
206: pan/tilt drive unit
210: pan/tilt control unit
230: robot-side communication unit
250: imaging element
300: terminal device
310: terminal-side communication unit
320: terminal control unit
330: input unit
340: display unit
350: recording unit
400: imaging plan generation device
401: space information acquisition unit
403: deck slab imaging decision unit
405: steel member imaging decision unit
407: imaging plan generation unit
409: distance measurement unit
413: member information acquisition unit
417: imaging plan correction unit
419: imaging plan adjustment unit
421: imaging plan addition unit
427: imaging plan database
429: storage control unit

What is claimed is:

1. An imaging plan generation device that generates an imaging plan of a camera-equipped mobile robot moving a camera within a three-dimensional space and changing a posture of the camera in imaging a deck slab and steel members including a main girder and a cross beam or a cross frame of a bridge as an inspection target, the imaging plan generation device comprising:

a space information acquisition unit that acquires space information of one panel divided by two facing main girders and two facing cross beams or cross frames;

a first decision unit that decides, based on the space information of the panel, a plurality of deck slab imaging positions and postures of the camera in dividing the entire deck slab corresponding to the one panel into a plurality of pieces and imaging the plurality of pieces with the camera;

a second decision unit that decides, based on the space information of the panel, a plurality of steel member imaging positions and postures of the camera in imaging at least a plurality of joint portions of the steel members among the steel members corresponding to the one panel with the camera; and an imaging plan generation unit that generates the imaging plan of the camera-equipped mobile robot based on the plurality of deck slab imaging positions and postures decided by the first decision unit and the plurality of steel member imaging positions and postures decided by the second decision unit, the generated imaging plan being transmitted to the robot to adjust the camera and the robot to capture an image of the imaging a deck slab and steel members.

2. The imaging plan generation device according to claim 1, wherein the space information acquisition unit acquires the space information based on CAD drawing data of the bridge.

3. The imaging plan generation device according to claim 1, wherein the space information acquisition unit acquires a first distance to the two facing main girders, a second distance to the two facing cross beams or cross frames, and a third distance to the deck slab based on a robot initial position within the three-dimensional space measured by a distance measurement unit, and acquires the space information based on the acquired first distance, second distance, and third distance.

4. The imaging plan generation device according to claim 3, wherein the first decision unit calculates a deck slab imaging range using the third distance, a focal length of the camera, and a size of an imaging element of the camera, and decides the deck slab imaging positions based on the deck slab imaging range and the space information of the panel.

5. The imaging plan generation device according to claim 3, further comprising:

a member information acquisition unit that acquires member information as information relating to a member of the panel, the member information being information relating to a fourth distance to a lateral frame based on the robot initial position, a width of the lateral frame, and a shape of the lateral frame, wherein the first decision unit decides the deck slab imaging positions and postures based on the space information of the panel and the member information, and the second decision unit decides the steel member imaging positions and postures based on the space information of the panel and the member information.

6. The imaging plan generation device according to claim 5, wherein the first decision unit calculates a deck slab imaging range using the third distance, a focal length of the camera, and a size of an imaging element of the camera, and decides the deck slab imaging positions based on the deck slab imaging range and the space information of the panel.

7. The imaging plan generation device according to claim 5, wherein the first decision unit calculates a horizontal plane imaging range as an imaging range in a horizontal plane of the lateral frame using the fourth distance, a focal length of the camera, and a size of an imaging element of the camera, and decides the deck slab imaging positions and postures based on the space information of the panel, the member information, and the horizontal plane imaging range.

8. The imaging plan generation device according to claim 7, wherein the first decision unit calculates a deck slab imaging range using the third distance, a focal length of the camera, and a size of an imaging element of the camera, and decides the deck slab imaging positions based on the deck slab imaging range and the space information of the panel.

9. The imaging plan generation device according to claim 1, further comprising:

a member information acquisition unit that acquires member information as information relating to a member of the panel, wherein the first decision unit decides the deck slab imaging positions and postures based on the space information of the panel and the member information, and the second decision unit decides the steel member imaging positions and postures based on the space information of the panel and the member information.

10. The imaging plan generation device according to claim 1, further comprising:

an imaging plan database in which a plurality of existing imaging plans are stored, wherein the first decision unit selects the existing imaging plan from the imaging plan database based on the space information of the panel and decides the deck slab imaging positions based on the selected existing imaging plan, and the second decision unit selects the existing imaging plan from the imaging plan database based on the space information of the panel and decides the steel member imaging positions and postures based on the selected existing imaging plan.

11. The imaging plan generation device according to claim 10, further comprising:

a member information acquisition unit that acquires member information as information relating to a member of the panel, wherein the imaging plan generation unit corrects the deck slab imaging positions and postures decided by the first decision unit and the steel member imaging positions and postures decided by the second decision unit based on the difference between the space information acquired by the space information acquisition unit and space information of the selected imaging plan or the difference between the member information acquired by the space information acquisition unit and member information of the selected imaging plan.

12. The imaging plan generation device according to claim 10, further comprising:

a storage control unit that makes the imaging plan database store the imaging plan generated by the imaging plan generation unit.

13. The imaging plan generation device according to claim 1, further comprising:
an imaging plan adjustment unit that adjusts the deck slab imaging positions and postures or the steel member imaging positions and postures in the imaging plan generated by the imaging plan generation unit based on an adjustment command of the deck slab imaging positions and postures or the steel member imaging positions and postures.

14. The imaging plan generation device according to claim 1, further comprising:
an imaging plan addition unit that adds the deck slab imaging positions or the steel member imaging positions to the imaging plan generated by the imaging plan generation unit based on an addition command of the deck slab imaging positions or the steel member imaging positions.

15. The imaging plan generation device according to claim 1,
wherein the first decision unit decides the deck slab imaging positions in a case where the camera is made to face the deck slab.

16. An imaging plan generation method that generates an imaging plan of a camera-equipped mobile robot moving a camera within a three-dimensional space and changing a posture of the camera in imaging a deck slab and steel members including a main girder and a cross beam or a cross frame of a bridge as an inspection target, the imaging plan generation method comprising:
a space information acquisition step of acquiring space information of one panel divided by two facing main girders and two facing cross beams or cross frames;
a first decision step of deciding, based on the space information of the panel, a plurality of deck slab imaging positions and postures of the camera in dividing the entire deck slab corresponding to the one panel into a plurality of pieces and imaging the plurality of pieces with the camera;
a second decision step of deciding, based on the space information of the panel, a plurality of steel member imaging positions and postures of the camera in imaging at least a plurality of joint portions of the steel members among the steel members corresponding to the one panel with the camera;
an imaging plan generation step of generating the imaging plan of the camera-equipped mobile robot based on the plurality of deck slab imaging positions and postures decided in the first decision step and the plurality of steel member imaging positions and postures decided in the second decision step, and
a transmitting step of transmitting the generated imaging plan to the robot to adjust the camera and the robot to capture an image of the imaging a deck slab and steel members.

17. A non-transitory computer-readable tangible medium comprising computer executable instructions stored thereon, which, when executed by one or more processors, cause the one or more processors to perform an imaging plan generation method that generates an imaging plan of a camera-equipped mobile robot moving a camera within a three-dimensional space and changing a posture of the camera in imaging a deck slab and steel members including a main girder and a cross beam or a cross frame of a bridge as an inspection target, the imaging plan generation method comprising:
a space information acquisition step of acquiring space information of one panel divided by two facing main girders and two facing cross beams or cross frames;
a first decision step of deciding, based on the space information of the panel, a plurality of deck slab imaging positions and postures of the camera in dividing the entire deck slab corresponding to the one panel into a plurality of pieces and imaging the plurality of pieces with the camera;
a second decision step of deciding, based on the space information of the panel, a plurality of steel member imaging positions and postures of the camera in imaging at least a plurality of joint portions of the steel members among the steel members corresponding to the one panel with the camera;
an imaging plan generation step of generating the imaging plan of the camera-equipped mobile robot based on the plurality of deck slab imaging positions and postures decided in the first decision step and the plurality of steel member imaging positions and postures decided in the second decision step, and
a transmitting step of transmitting the generated imaging plan to the robot to adjust the camera and the robot to capture an image of the imaging a deck slab and steel members.

* * * * *